United States Patent
Eshet et al.

(10) Patent No.: US 8,107,526 B2
(45) Date of Patent: Jan. 31, 2012

(54) METHOD AND SYSTEM FOR SCALABLE REPRESENTATION, STORAGE, TRANSMISSION AND RECONSTRUCTION OF MEDIA STREAMS

(75) Inventors: Amit Eshet, Tel-Aviv (IL); Ran Oz, Modi'in (IL); Nery Strasman, Ramat-Gan (IL)

(73) Assignee: ARRIS Group, Inc., Suwanee, GA (US)

( * ) Notice: Subject to any disclaimer, the term of this patent is extended or adjusted under 35 U.S.C. 154(b) by 1757 days.

(21) Appl. No.: 11/326,779

(22) Filed: Jan. 6, 2006

(65) Prior Publication Data
US 2006/0244840 A1 Nov. 2, 2006

Related U.S. Application Data

(63) Continuation of application No. 09/870,708, filed on May 29, 2001, now Pat. No. 7,116,717, which is a continuation-in-part of application No. 09/461,859, filed on Dec. 15, 1999, now Pat. No. 6,879,634.

(51) Int. Cl.
*H04N 11/02* (2006.01)
*H04N 7/12* (2006.01)

(52) U.S. Cl. .............. 375/240.01; 375/240.26

(58) Field of Classification Search .......... 375/240.02–240.29, 240, 240.01
See application file for complete search history.

(56) References Cited

U.S. PATENT DOCUMENTS

| | | | |
|---|---|---|---|
| 5,216,503 A | 6/1993 | Paik et al. | 358/133 |
| 5,629,736 A | 5/1997 | Haskell et al. | 348/387 |
| 5,742,343 A | 4/1998 | Haskell et al. | 348/415 |
| 5,847,760 A | 12/1998 | Elmaliache et al. | 348/390 |
| 5,966,120 A | 10/1999 | Arazi et al. | 345/327 |
| 6,014,694 A | 1/2000 | Aharoni et al. | 709/219 |
| 6,317,462 B1 | 11/2001 | Boyce | 375/240 |
| 6,480,541 B1 | 11/2002 | Girod et al. | 375/240 |
| 6,928,087 B2 | 8/2005 | Slowe et al. | 370/477 |
| 2005/0117641 A1* | 6/2005 | Xu et al. | 375/240.08 |

FOREIGN PATENT DOCUMENTS
EP 0 634 871 A2 7/1994
* cited by examiner

*Primary Examiner* — Tesfaldet Bocure
(74) *Attorney, Agent, or Firm* — Troy A. Van Aacken; Robert J. Starr

(57) ABSTRACT

Methods and systems for defining a compression and reconstruction scheme of a media stream, for generating and transmitting a base media layer and enhancement data layers and for reconstructing compressed representations of the media stream from the base media layer and the enhancement data layers.

20 Claims, 16 Drawing Sheets

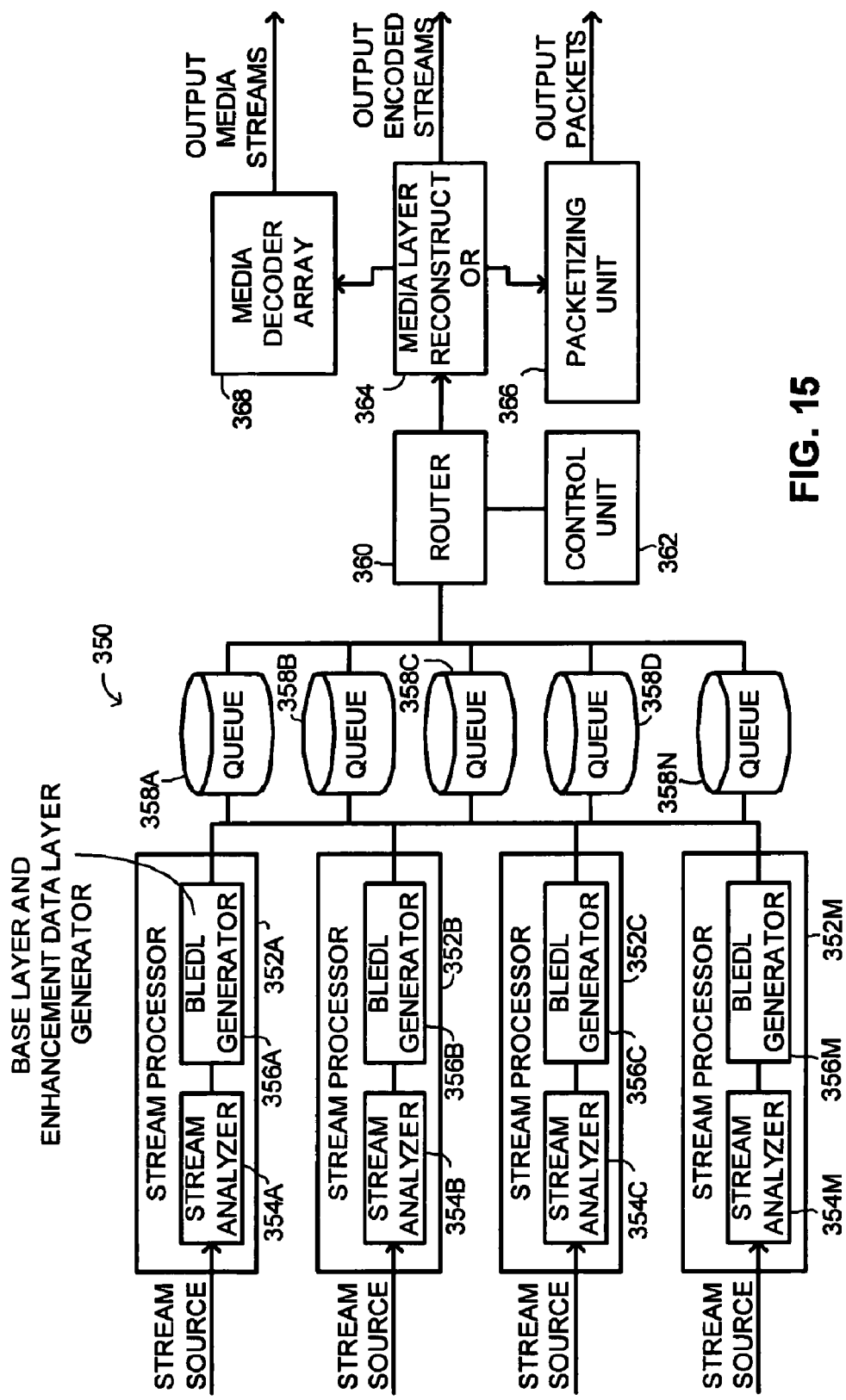

METHOD AND SYSTEM FOR SCALABLE REPRESENTATION, STORAGE, TRANSMISSION AND RECONSTRUCTION OF MEDIA STREAMS

RELATED CASES

This application is a Continuation of U.S. patent application Ser. No. 09/870,708 filed May 29, 2001 now issued as U.S. Pat. No. 7,116,717 on Oct. 3, 2006, which is a Continuation-In-part of U.S. patent application Ser. No. 09/461,859 filed Dec. 15, 1999 now issued as U.S. Pat. No. 6,879,634 on Apr. 12, 2005, and are herein incorporated by reference.

FIELD OF THE INVENTION

The present invention relates to methods and systems for scalable representation, storage, transmission and reconstruction of media streams, and to methods and systems for transmitting media streams over variable bandwidth communication lines, in particular.

BACKGROUND OF THE INVENTION

Information signals, such as media signals and especially compressed video and audio streams and packetized audio and video streams propagate over a medium such as communication channels, and especially terrestrial, wireless, satellite and cable communication channels. Video streams usually include a relatively large amount of information and are usually stored in storage units and transmitted over communication channels in a compressed form.

The Moving Pictures Experts Group (MPEG) specifications are standardized methods for compressing and transmitting media signals such as video and audio.

As media signals, such as media signal arranged in streams, sequences of media signals and the like are transmitted over communication channels there is a need to match the bit rate of the media streams to the available bandwidth of the communication channels or to an available storage space of a storage unit. This match usually requires a reduction of the bit rate of the media streams. Very frequently, the bandwidth of even a compressed representation of a media stream requires more bandwidth than available and the transmission of the entire media stream is not feasible. Furthermore, a loss of media stream portions, such as packets conveying the media stream may result in severe quality degradation.

There is a need to provide methods and systems for a compact representation of a media stream. There is a further need to provide systems and methods for robust transmission methods of media streams, and especially systems and methods for allowing for recovering from a loss of some portions of the media stream. There is yet a further need to provide systems and methods for an efficient utilization of prioritized communication channels, quality of service communication channels and differential-service-supporting communication channels. There is another need to provide systems and methods for secure transmission of media streams. There is yet another need to provide an effective system and method for transmitting representations of media streams over variable bandwidth channels. There is a need to provide systems and methods for efficiently reconstructing a media stream from various representations of the media stream.

SUMMARY OF THE PRESENT INVENTION

It is an object of the present invention to provide a novel method and system for scalable representation, storage, transmission and reconstruction of media streams, which overcomes the disadvantages of the prior art.

In accordance with a preferred embodiment of the present invention, there is provided a system and method for providing compact representation of a media stream by a base media layer stream and if necessary by enhancement data. The amount of generated and eventually transmitted or stored enhancement data is reduced by utilizing previous reconstruction decisions. Compressing the enhancement data further reduces the size of the enhancement data. Conveniently, portions of the enhancement data and the base media layer allow for reconstructing a plurality of compressed representations of the media streams, each compressed representation being characterized by statistically a distinct compression level. The loss of media packets conveying enhancement data results in a temporal degradation in the quality of the media stream, but allows for reconstructing and generating a compressed representation of the media stream of a quality that is above a predefined base level quality. Associating higher priorities to compressed representations of lower quality and statistically higher compression allows for utilizing priority communication channels, quality of service communication channels and differential-service-supporting communication channels in an efficient manner, such that at least the base media layer is transmitted at a relatively high probability.

In accordance to a preferred embodiment of the invention the aggregate bandwidth of the base media layer and, if possible, at least portions of the enhancement data do not exceed the available bandwidth of the communication channel.

BRIEF DESCRIPTION OF THE DRAWINGS

The present invention will be understood and appreciated more fully from the following detailed description taken in conjunction with the drawings in which:

FIG. 15 is a schematic illustration of a video re-multiplexing system, constructed and operative in accordance with another preferred embodiment of the present invention.

DETAILED DESCRIPTION OF PREFERRED EMBODIMENTS

Figure 1:
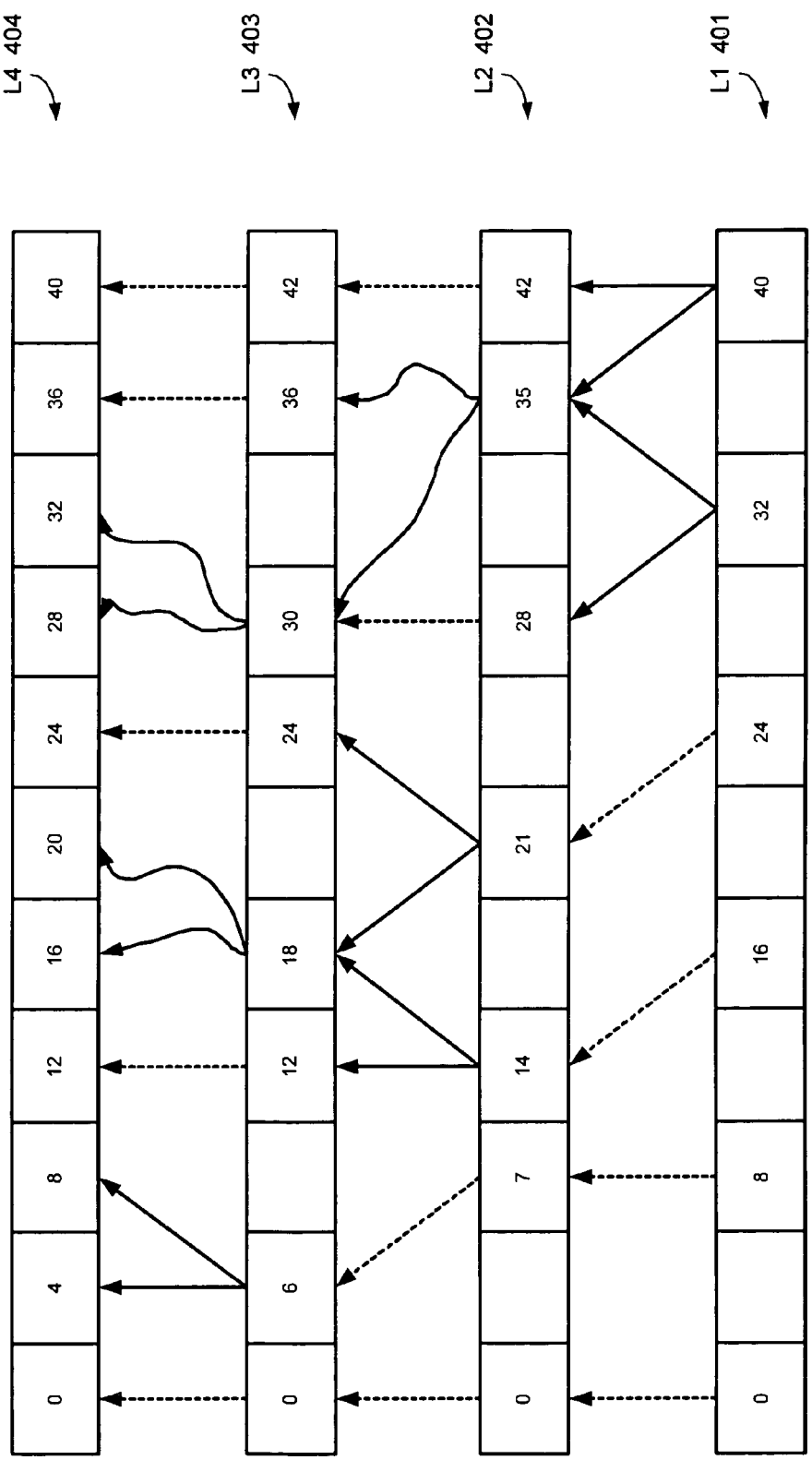
FIG. 1 is a visual representation of a set of four quantizer layers and a mapping between various symbols, in accordance with a preferred embodiment of the invention.

The present invention overcomes the disadvantages of the prior art by providing a novel method and system for converting a media stream into a basic data layer, conveniently of a lowest quality and statistically highest compression, and into enhancement data.

The invention provides methods and systems for a progressive representation of data, such as media data and especially compressed media data, MPEG compliant data and the like. A sequence of data symbols, such as original media layer symbols are represented by base media layer symbols and, if necessary, by at least one layer of enhancement data symbols. The base media layer has a predefined minimal quality. The enhancement data symbols allow for reconstructing higher quality media layer symbols. The invention allows for reconstruction of intermediate media layer symbols, each layer of varying quality that is higher than the quality of the base media layer symbols but lower than the quality of the original media layer symbols. The reconstruction is based upon the base media layer symbols, and optionally also upon either layer enhancement data symbols and/or previous reconstruction decisions.

The progressive representation of the media stream, allows for adjusting the bit rate and accordingly the quality of transmitted and reconstructed media signals to the available bandwidth of a transmission channel, to the available storage space of a storage unit, or the like. The invention provides an improved quality to compression ratio, as enhancement data symbols are generated only when necessary. Enhancement data symbols can further be compressed using various compression schemes such as but not limited to Variable Length Coding.

An aspect of the invention is that the compressed representations of the media stream have the same format as the original medial layer data. For example, assuming that the original media stream is MPEG compliant. Such a media stream includes DCT coefficients that were quantized using a uniform quantizer that is characterized by an original quantizer value. Re-quantizing the original media stream using various quantizing scales generates compressed representations of the media stream. The base media layer is generated by the largest (most coarse) quantizing scale, while other compressed representations of the original media stream (also referred to as intermediate media layers) are generated by re-quantizing the original media stream by quantizer values that are smaller than the base quantizing scale but larger than the original quantizing scale. Accordingly, each compressed representation of the original media stream is also MPEG compliant.

Another aspect of the invention is the allocation of an optimal number of symbols to refine the base media layer frame so that the original medial layer frame can be constructed. The "refinement cost" can be divided between several intermediate media layers such that best fits existing constraints.

According to another aspect of the invention, base media layer symbols are given a highest priority/urgency, while higher layer enhancement data symbols, allowing for reconstructing higher quality media layer symbols are given descending priorities/urgencies. The provision of priorities for base data symbols and enhancement data symbols is highly useful in quality of service supporting communication systems, in priority supporting communication modules, differential-service-supporting communication modules, Diff-Serv supporting communication modules and the like. Accordingly, the base media layer symbols will be serviced/switched first, while higher layer enhancement data symbols will be serviced/switched last.

According to another aspect of the invention a plurality of media streams can be processed, each by a distinct compression and enhancement data generation schemes, to provide a plurality of base media layers and associated enhancement data layers. The base media layers and if possible, at least some of the associated enhancement data layers can be transmitted and used to reconstruct compressed representations of the plurality of media streams.

The invention provides a method for generating compressed representations of a media stream, the method including the steps of: determining a plurality of compression levels for the media stream and a relationship between possible valid values of compressed representations of the media stream, each compressed representation of the media stream associated with one of the compression levels; defining the highest level of compression of the compression levels as a base level; and defining enhancement data for representing a relationship between possible valid values of the compressed representations of the media stream.

The invention provides a method for generating compressed representations of a media stream, further including the steps of: compressing the media stream according to the compression levels, thereby producing a plurality of compressed representations of the media stream; defining a selected one of said compressed representations of the media stream a base layer, the selected compressed version being compressed according to a base level; determining if enhancement data is required for reconstructing a compressed representation of the media stream; and generating enhancement data, in response to the determination.

The invention provides a method for generating compressed representations of a media stream, the media stream including a plurality of media stream symbols, the method including the steps of: determining a plurality of compression functions of statistically distinct compression levels, wherein applying a compression function on the media stream produces a compressed representation of the media stream; determining a relationship between possible valid values of compressed representations of the media stream; defining the statistically most compressed representation of the media stream as a base layer media stream; defining enhancement data for representing a relationship between possible valid values of the compressed representations of the media stream; compressing the media stream by applying the compression functions, thereby producing a plurality of compressed representations of the media stream; determining if enhancement data is required for reconstructing a compressed representation of the media stream; and generating enhancement data, in response to the determination.

The invention provides a method for generating a reconstructed media stream, the method including the steps of: determining a compression scheme and an enhancement data generation scheme utilized for generating a base media layer stream and enhancement data, the enhancement data representing a relationship between possible valid values of compressed representation of the original media stream; receiving the base media layer and at least a portion of the enhancement data; producing the reconstructed media stream from the received base media layer and, if possible, from at least a portion of the enhancement data in response to the compression scheme and enhancement data generation scheme.

According to some aspects of the invention, enhancement data is generated only if it is required for reconstructing at least a portion of a compressed representation of an original media stream. Said portion is usually a symbol. The necessity of an enhancement data, and especially an enhancement data symbol that reflects a relationship between two possible values of distinct compressed representations of an original media stream, is determined in response to at least one of the following terms/parameters: (a) The amount of possible valid values of a compressed representation of the media stream associated with a possible valid value of a previous compressed representation of the media stream. (b) The relationship between possible valid values of the original media stream mapped to possible valid values of compressed representations of the media stream. (c) The relationship between possible valid values of higher compressed representations of the media stream, higher compressed representations of the media stream characterized by a higher compression level.

Conveniently, for p>1 (the base media layer being he first layer p=1), a p'th layer enhancement data reflects the relationship between a (p−1)'th compressed representation of the media stream and the p'th compressed representation of the media stream. The necessity of a p'th layer enhancement data, and especially of a p'th layer enhancement data symbol is determined in response to at least one of the following terms/parameters: (A) Possible valid values of the original media stream being associated with possible valid values of both the p'th and the (p−1)'th compressed representation of the media stream; (B) The amount of possible valid values of the p'th compressed representation of the media stream associated with the possible valid value of the (p−1)'th compressed representation of the media stream; (C) (p-m)'th media layer symbols that were generated from the base media layer symbol, I<m<p; (D) An original (p−1)'th layer symbol set, the original (p−1)'th symbol set includes original media layer symbols associated with the (p−1)'th media layer symbol; (E) An updated (p−1)'th layer symbol set reflecting previous layer symbol sets; (F) An original p'th layer symbol sets, associated with at least one relevant p'th media layer symbol, a relevant p'th media layer symbol being mapped to the (p−1)'th media layer symbol, the original p'th symbol set includes original media layer symbols associated with the p'th media layer symbol; (G) A p'th media layer set; (H) An original p'th layer symbol subsets associated with a true p'th media layer symbol.

According to another aspect of the invention the enhancement data is further compressed, encoded and/or encrypted. Conveniently, the enhancement data is variable length encoded. The enhancement data usually reflects a difference between associated possible values of the compressed representations of the media stream.

The invention provides a method for transmitting a transmitted representation of a media stream over a bandwidth limited medium, the method comprising the steps of: determining a plurality of compression functions of statistically distinct compression levels, wherein applying a compression function on the media stream produces a compressed representation of the media stream; determining a relationship between valid values of compressed representations of the media stream; defining the statistically most compressed representation of the media stream as a base layer media stream; defining enhancement data for representing a relationship between valid values of the compressed representations of the media stream; compressing the media stream by applying the compression functions, thereby producing a plurality of compressed representations of the media stream; determining if enhancement data is required for reconstructing a compressed representation of the media stream; generating an enhancement data layer, in response to the determination; determining an available bandwidth of the bandwidth limited medium; generating a transmitted representation of the media stream, the transmitted representation of the media stream includes at least the base media layer and can also include at least one successive enhancement data layer, wherein the aggregate bandwidth of the base media layer and (if transmitted) the at least one successive enhancement data layer does not exceed the available bandwidth of the bandwidth limited medium; and providing the transmitted representation of the media stream to the bandwidth limited medium. It is noted that the generation of the transmitted representation is not necessarily dependent upon a measurement of an estimation of the available bandwidth. Usually a predetermined amount of compressed representations are generated and stored in a storage medium. At least some of the representations are later fetched and transmitted over the communication medium.

The invention provides a method for generating a reconstructed media stream, the method including the steps of: determining a compression scheme and an enhancement data generation scheme utilized for generating a base media layer stream and enhancement data; enhancement data representing a relationship between valid values of compressed representation of the original media stream; receiving the base media layer and (if transmitted) at least a portion of the enhancement data; and producing the reconstructed media stream from the received base media layer stream and (if possible) at least portion of the enhancement data in response to the compression scheme and enhancement data generation scheme.

The invention provides a method for providing scalable bandwidth transmission of a plurality of media streams, the method including the steps of: determining a group of compression levels for each said media streams; and defining the highest level of compression of said compression levels of each said media streams, as a base level thereof.

The invention provides a method for reconstructing portions of media streams from portions of a base layer streams and respective portions of at least one enhancement data layer streams, the method including the steps of: detecting an association between each said base layer stream portions and at least a respective portion of at least one respective enhancement data layer streams; determining if an enhancement data layer portion is required for reconstructing a portion of a compressed representation of a media stream; and reconstructing the portion of the compressed representation of the media stream in response to the determination.

The invention provides a method for inserting watermarks into a media stream. A media stream can be altered by an insertion of the watermark. The watermark can be inserted in the base media layer and/or at least one enhancement data layer. The invention allows to calculate the effect (error) of inserting the watermark, in view of the compression scheme and enhancement data generation scheme. The watermark can be divided between at least one layer, whereas the placement of a watermark within a higher enhancement data layer results in smaller errors.

The invention provides a method for providing scalable bandwidth transmission of a plurality of media streams, via a communication channel, the method including the steps of: determining a group of compression levels for each said media streams; defining the highest level of compression of said compression levels of each said media streams, as a base level thereof, wherein the total sum of the compressed versions of said media streams according to the respective ones of said base levels, at any point in time, is less than an available bandwidth of the communication channel.

The invention provides a scalable bandwidth transmission media stream generating apparatus including: a media analyzer; a base layer and an enhancement data layer generator, said media analyzer receiving a media stream and determining a compression scheme, said base layer and enhancement data layer generator processing said media stream according to said compression scheme, thereby producing a base layer and a plurality of enhancement data layers.

Conveniently, the scalable bandwidth transmission media stream generating apparatus includes at least one of the following units: (a) a storage unit, connected to said base layer and enhancement data layer generator, wherein said storage unit is divided to a plurality of queues, each said queues storing a selected one of said base layers and said enhancement data layers; (b) a switching controller, connected to said storage unit, for retrieving selected successive ones of said base layers and said enhancement data layers; or (c) a media layer reconstructing unit, connected to said switching controller, for producing a reconstructed media stream from said base layer and at least a successive one of said enhancement data layers, received from said routing unit.

The invention provides a scalable bandwidth transmission media stream generating apparatus including: a plurality of media analyzers; and a plurality of base layer and enhancement data layer generators, each associated with and connected to a selected one of said media analyzers, each said media analyzers receiving a different media stream and determining a compression scheme, each said base layer and enhancement data layer generators processing said media stream according to said compression scheme, thereby producing a base layer and a plurality of enhancement data layers.

Conveniently, the scalable bandwidth transmission media stream generating apparatus includes at least one of the following units: (a) a storage unit, connected to said base layer and enhancement data layer generators, wherein said storage unit is divided to a plurality of queues, each said queues storing a selected one of said base layers and said enhancement data layers; (b) a switching controller, connected to said storage unit, for retrieving selected successive ones of said base layers and said enhancement data layers; or (c) a media layer reconstruction unit, connected to said switching controller, for producing a reconstructed media streams from said base layers and optionally from at least one additional enhancement data layer, received from said routing unit.

According to a further aspect of the invention the base layer and if possible, at least a portion of the enhancement data, are transmitted. Conveniently, the base layer and at least a portion of the enhancement data are transmitted over a communication medium, and the aggregate bandwidth of the base layer and, if possible, at least a portion of the transmitted enhancement data does not exceed an available bandwidth of the communication medium.

According to yet a further aspect of the invention, the base layer and compressed representations of the original media stream are associated with increasing priorities. Conveniently, they are transmitted to a remote location over a prioritized communication medium.

According to yet another aspect of the invention the base layer and, if possible, at least a portion of the enhancement data are packetized prior to the transmission.

According to yet a further aspect of the invention, the provision of a base layer and, if possible, at least one enhancement data layer is further constrained by additional parameters such as but not limited to a clients profile. For example, providing higher quality media streams, including more enhancement data, to clients that pay more money.

Although the present invention is described predominantly in terms of the transmission and storage of video and audio information encoded in accordance with the MPEG format, the concepts and methods are broad enough to encompass distribution systems using other data compression techniques and other data formats. Throughout this detailed description, numerous details are specified such as program types and data stream structures, in order to provide a thorough understanding of the present invention.

Although the present invention is described predominantly in terms of quantizing media signals and especially quantizing media signals by uniform quantizers to generate various medial layers, the concepts and methods are broad enough to encompass various other types of statistically bit reducing schemes, and various other mapping/parsing functions. For example, sampling functions.

MPEG-Video can be provided at a constant bit-rate (CBR) or at a variable bit-rate (VBR). MPEG Transport can technically also be one of either but conventionally only CBR transport is used. Usually, each program may be VBR but their sum is CBR at the Transport's total bit rate.

The present invention provides a novel method, which multiplexes a plurality of programs, such as but not limited to Constant Bit Rate (CBR) or Variable Bit Rate (VBR) in such a way, that their sum never exceeds the available transport bit rate/available bandwidth and that no bandwidth be wasted. This is done by analyzing the encoded streams, altering them, producing new legal encoded streams and multiplexing the new streams into a transport format so that the available bandwidth isn't exceeded and all the bandwidth is used.

As stated above, the examples set forth in the following description are provided with respect to MPEG ISO/IEC 11172-2 and ISO/IEC 13818-2 video compression standards. A picture, which is to be encoded includes either a complete frame, or a field, which is the even or odd lines of a complete frame. The above standards define three types of encoded pictures, an I-picture, a B-picture and a P-picture. These are also referred to as I-frame, B-frame and P-frame. An I-frame (Intra-frame) includes the entire information which is required to reconstruct the encoded picture. A P-frame (Predictive frame) includes information, which, in combination with previously encoded P-frames and I-frames, can reconstruct the encoded picture. A B-frame (Bi-directional frame) includes information, which, in combination with previously encoded I-frames and P-frames, can reconstruct the encoded picture.

A picture to be encoded is divided into components at different levels. A slice includes a predetermined number of lines. A block includes a matrix of 8×8 pixels. A macro-block includes a 2×2 matrix of luminance blocks (which results in a 16×16 matrix of pixels).

Each block of pixels is transformed using Discrete Cosine Transform (DCT) which produces a respective sequence of values. These values are then processed to provide quantized values. The latter processing is characterized by a quantizing scale. The usage of relatively small quantizing scale provides statistically relatively low compression and statistically small quality degradation, and vice verse. For example, if the DCT results in the following sequence 16, 5, 10, 2, 0, 4 the quantizing scale is 6, the each DCT result is divided by six, and the result is truncated to provide the quantized result, then the resulting sequence is 2, 0, 1, 0, 0, 0. It is noted that a different quantizing value can be used for every macro-block.

After the DCT and quantizing stages, the set of values, includes a large number of zero values. It is noted that a larger number of zero values is preferable for efficient data compression. The values are further encoded using a method called Run Level Encoding (RLE), which transforms the sequence into alternating values, arranged as pairs. One of the values is a value greater than zero that is taken from the sequence, and the other value reflects the number of zeros that preceded it in the same sequence.

Although the present invention is described predominantly in terms of the compression of video and audio information by means of linear quantizers that do not have an offset, the concepts and methods are broad enough to encompass various compression techniques, and especially the quantizing by non-linear quantizers, quantizing with quantizers that have an offset, and the like. It is further noted that a set of quantizers are used to provide the basic media layer and the enhancement data and that the mapping between values of distinct quantizer layers can be changed dynamically, such as every macroblock. In the case of quantized original data, several quantizers may have been used throughout the original data. The quantizers used for other layers may either be predefined for the entire data, or may depend on the quantizers of the original data, and thus change as well. For example, in MPEG video the quantizer value may change between macro-blocks. Thus, the quantizer value of each of the other layers can either be set for the entire stream, or also change between macro-blocks or any subsets of the stream in accordance with the original quantizer value.

The present invention provides a method in which a original media layer including a sequence of original media layer symbols is further quantized to provide a plurality of media layers characterized by a plurality of quantization levels. The media layer having the highest quantization level is set to be the base media layer. The output data includes the base media layer symbols and enhancement data symbols, for allowing reconstruction of higher (quality) media layers, up to the original media layer. It is noted that a media layer symbol can include at least one signal. For example, a media layer symbol representative of a DCT coefficient be represented by twelve bits.

A media stream includes a plurality of media signals that are conveniently grouped as a sequence of media symbols. These sequences usually are packetized such that a media stream includes at least one packet. A media stream can also include a plurality of media streams.

According to an aspect of the invention, the reconstruction of a p'th media layer symbol (p>2) is based upon the reconstruction of the (p−1)'th media layer symbol and previous media layer symbols, thus allowing to reduce the amount of generated and eventually transmitted enhancement data symbols.

According to another aspect of the invention the enhancement data symbols are compressed by a Variable Length Code, allocating shorter VLC code word to more statistically frequent appearing enhancement data symbols.

The following description addresses a stream component, which is a single frame. It is noted, for the purpose of the present invention, that frame can be replaced by any other stream component such as a slice, a macro-block, a block, a field and the like.

Reference is now made to FIG. 1, which is a visual representation of a set of four quantizer layers and a mapping between various symbols, in accordance with a preferred embodiment of the invention.

The following description addresses four quantizer layers and maps either one or two high quantizer layer values with a lower quantizer layer value. It is noted, for the purpose of the present invention that the number of quantizer layers and accordingly the number of compressed representations of the original media stream can exceed three and that more than two high quantizer layer values can be mapped to a single lower quantizer layer value. For example, Table 2 illustrates a coding scheme that can be used when up to sixteen high quantizer layer values can be mapped to a single lower quantizer layer value.

The fourth quantizer layer L4 404 has a quantizer value of $Q_4=4$ and has no offset, such that the possible values of L4 are 4*r, r=0,1,2,3 ... L4 404 is also referred to as the original quantizer layer. The third quantizer layer L3 403 has a quantizer value of $Q_3=6$ and has no offset, such that the possible values of L3 are 6*s, s=0,1,2 ... The second quantizer layer L2 402 has a quantizer value of $Q_2=7$ and has no offset, such that the possible values of L2 are 7*t, t=0,1,2 ... The second and third quantizer layers are also referred to as intermediate quantizer layers. The first quantizer layer L1 401 has a quantizer value of $Q_1=8$ and has no offset, such that the possible values of L1 are 8*u, u=0,1,2 ... L1 401 is also referred to as the base quantizer layer. Each quantizer layer illustrates the possible values of a media layer symbols represented by said quantizer. Each media layer is also referred to as a compressed representation of the original media stream.

For convenience of explanation, the representations of a media stream by L1-L4 are referred to as base media layer, second media layer, third media layer and original media layer, respectively. Base media layer symbols may have values of 8*u, second media layer symbols may have values of 7*t, third media layer symbols may have values of 6*s, and original media layer symbols may have values of 4*r.

Conveniently, the base media layer is generated from the original media layer. The base and the original media layers are then used to generate second to fourth layer enhancement data symbols. A p'th layer enhancement data symbol allows for reconstructing a p'th layer symbol from a (p−1)'th data layer symbol. According to an aspect of the invention, the base media layer is transmitted, and is followed by a transmission of successive layer enhancement data symbols, starting from second layer enhancement data symbols.

L1 can be selected, for example, such that the base media layer has minimal accepted quality or required size. It is important to note that the base media layer can be represented in the same format as the original media layer, so that the same decoder used for decoding the original media layer, if any, can be used for decoding the base media layer.

At the decoding end, the base media layer is received first, while the successive reception of layer enhancement data symbols of successive layers, allows for reconstructing second media layer symbols and successive media layer symbols.

The original media layer is statistically of the highest quality and lowest compression, while the base media layer is statistically of the lowest quality and the highest compression.

Each value of a quantizer layer (except the values of the original layer), is associated with at least one value of the original quantizer layer and at least one value of a higher quantizer layer. For example, the values 0,8,16 and 24 of L4 404 are associated with the values 0,7,14 and 21 of L3 403 respectively. The value 32 of L4 404 is associated with values 28 and 35 of L3 403. The value 8 of L4 404 can be associated with values 4 or 8 of L1 401.

Accordingly, each media layer symbol (except the original media layer symbols) is associated with at least one possible original media layer symbol and at least one higher media layer symbol.

When a p'th media layer symbol (p=4,3,2) can be associated with more than a single (p−1)'th media layer symbol, the reconstruction of the p'th media layer symbol from the (p−1)'th media layer symbol requires additional information. The additional information allows for selecting one out of the plurality of possible associated p'th media layer symbols. The additional information is either provided as an enhancement data or may be learnt from at least one (p-m)'th media layer symbol, and/or from a (p-m)'th layer enhancement data symbol, 1<m≤p.

Referring to FIG. 1, three types of arrows are used to connect associated and potentially associated values of adjacent quantizer layers. Each dashed arrow connects a single value of the (p−1)'th quantizer layer with a single value of the p'th quantizer layer. Each pair of curved solid arrows connect a single value of the (p−1)'th quantizer layer with two associated values of the p'th quantizer layer, whereas the selection between the two values of the p'th quantizer layer is based upon values of lower quantizer layer symbols. In such cases there is no need to define an enhancement data symbol.

Each pair of straight solid arrow connects a single value of the (p−1)'th quantizer layer with two potentially associated values of the p'th quantizer layer, in cases where there is a need to define a p'th layer enhancement data symbol for each pair of p'th media layer symbols that are associated with the same (p−1)'th media layer symbol.

The arrows reflect a predetermined mapping scheme associating values of various quantizer layers. For example, the value 4 of L4 can be mapped to either value 0 of L3, L2 and L1 or can be mapped to value 6,7 and 8 of L3, L2 and L1 respectively. The selection between these values is predetermined. Conveniently, a predetermined mapping scheme that is aimed for better compression will map value 4 of L4 to value 0 of L1-L3, as a sequence of at least one DCT coefficient of value 0 is represented by a length value, indicating a number of successive DCT coefficients that equal zero. Furthermore, mapping values of higher quantizer layers to lower values of lower quantizer layers can provide better compression as lower DCT coefficient values, are statistically more common and are represented by shorter VRL code words.

Another predetermined scheme can try to reduce quantization errors. It is assumed that (a) value 4 of L4 is mapped to value 8 of L1, (b) value 8 of L4 is mapped to value 8 of L1 and to value 7 of L2, (c) value 7 of L2 is mapped to value 6 of L3, (d) value 6 can be mapped to values 4 and 8 of L4, and that (e) an original media layer symbol having a value of 4 is received at the encoder. The original media layer symbol is converted to a base media layer symbol of value 8, to a second media layer symbol of value 7 and to a third media layer symbol of value 6. As the third media layer symbol 6 can be mapped to two original media layer symbols of values 4 and 8, an original layer enhancement data symbol is required. The original layer enhancement data symbol will indicate that the received original media signal has a value of 4 (8), and accordingly the original layer enhancement data symbol will indicate "go up" ("go right").

Conveniently, the mapping scheme is either predefined or can change dynamically, as long that both the encoder and the decoder are aware of the mapping scheme. A dynamically changing mapping scheme requires a transmission of mapping scheme indications being representative of the mapping scheme or of the changes in the mapping scheme.

According to an aspect of the invention, enhancement data symbols are in the form of code words. Each value of an (p−1)'th quantizer layer that is mapped to at least two values of a p'th quantizer layer has a codebook. For example, a first codebook is associated with value 32 of L1, the first code word "go left" in the codebook indicates that value 32 of L1 is mapped to value 28 of L2 and the second code word "go right" indicates that value 32 of L1 is mapped to value 35 of L2. Using the same code words in different codebooks allows for reducing the size of the enhancement data.

Figure 2:
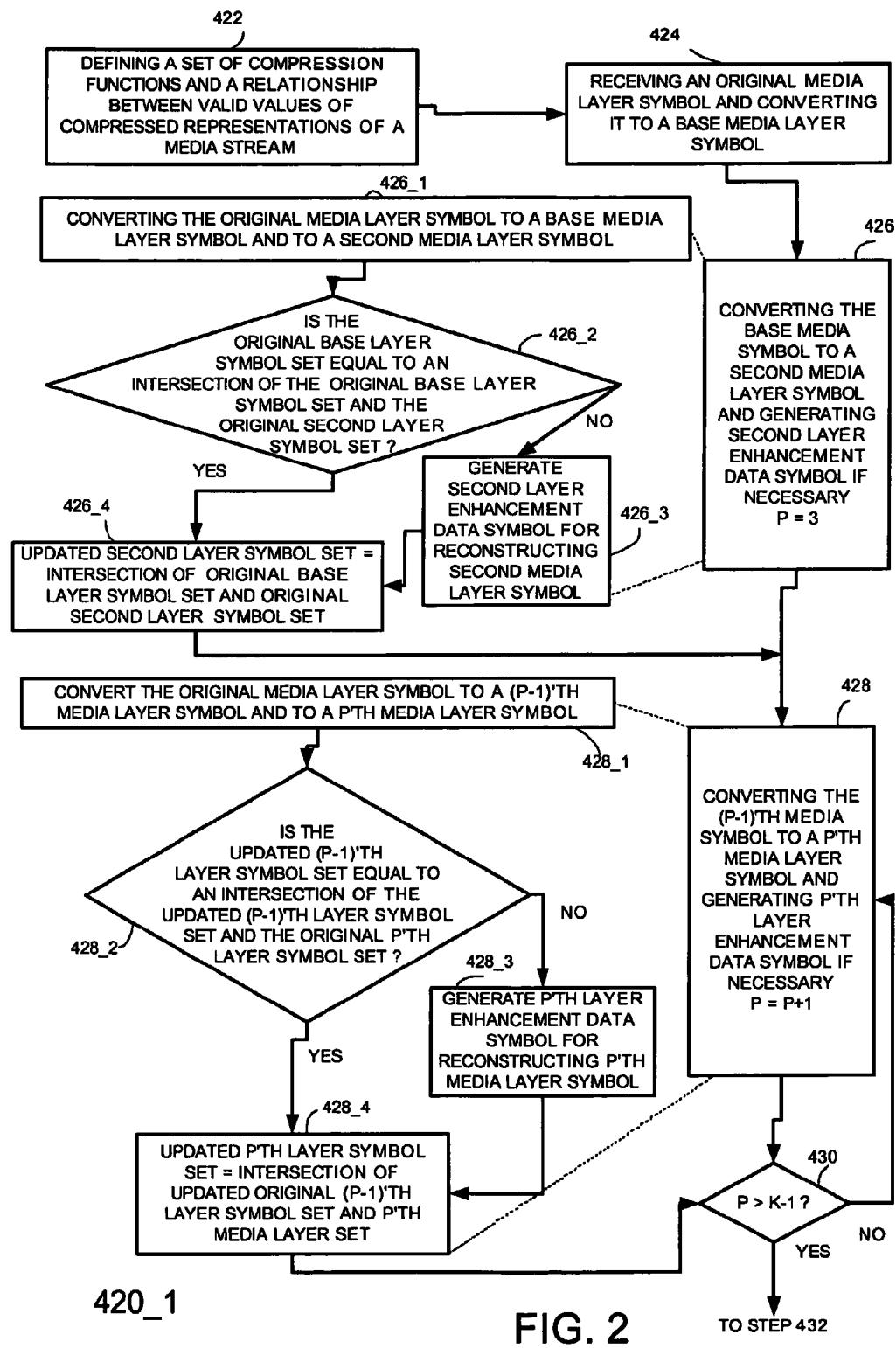
FIGS. 2-3 are flow charts that illustrate a method for generating a basic media layer and enhancement data, in accordance with a preferred embodiment of the invention.
Figure 3:
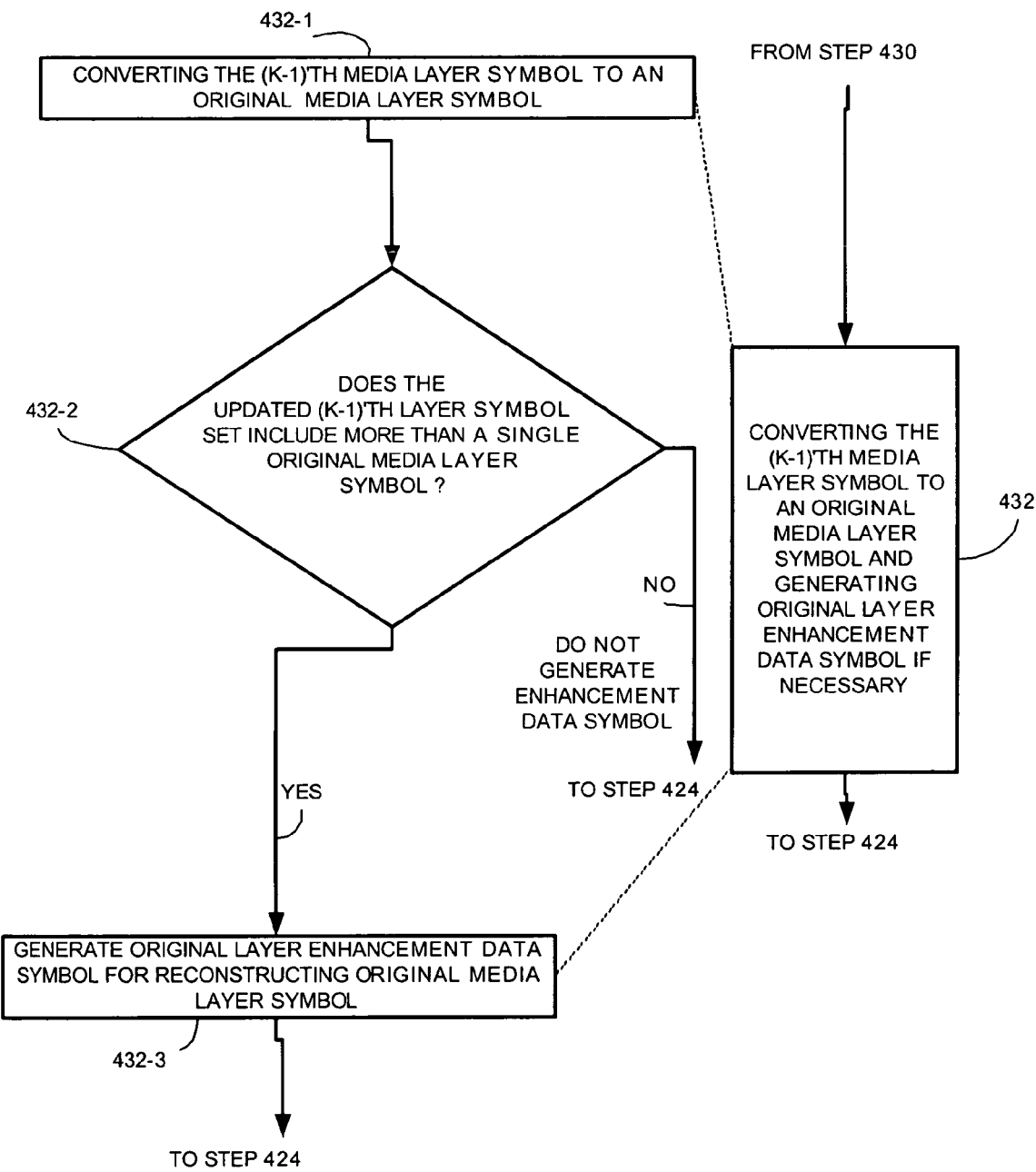

Referring to FIGS. 2-3 illustrating portions 420_1 and 420_2 of method 420 for generating a basic media layer and enhancement data, in accordance with a preferred embodiment of the invention.

Method 420 starts at step 422 of defining a set of compression functions and a relationship between valid values of compressed representations of a media stream. Referring to the example set forth in FIG. 1, step 422 includes selecting quantizer layers and determining the mapping between the values of the various quantizer layers. Step 422 includes selecting L1-L4 401-404 and determining the mapping between their values. For example mapping values 0,4,8,12, 16,20,24,28,32,36 and 40 of L4 to values 0,8,8,16,16,24,24, 32,32, 40 and 40 of L1 respectively. According to another exemplary mapping scheme, values 0,4,8,12,16,20,24,28,32, 36 and 40 of L4 are mapped to values 0,0,8,8,16,16,24,24,32, 32 and 40 of L1 respectively.

Step 422 is followed by step 424 of receiving an original media layer symbol and converting it to a base media layer symbol. Referring to the example set forth in FIG. 1, and assuming that the original media layer symbol is received as an original media layer symbol (i.e.—having possible values of 4*r) step 424 includes trans-coding the original media layer symbol to base media layer symbol. As L1 and L4 have a quantizing values of $Q_1$=8, and $Q_1$=4 respectively, the original media layer symbol is multiplied by 4 and quantized with a quantizing value of 8.

It is noted that at least one original media layer symbol can be mapped to a single base media layer symbol. The at least one original media layer symbol is referred to as an original base layer symbol set. For example, original media signals of values 4 and 8 are both mapped to a base media layer symbol of value 8. Accordingly, the original base symbol set of base media layer symbol of value 8 is (4,8).

Step 424 is followed by step 426 of converting the base media layer symbol to a second media layer symbol and generating a second layer enhancement data symbol, if necessary. Step 426 also includes setting an index p: p=3.

Step 426 includes steps 426_1 - 426_4. Step 426_1 of converting the original me layer symbol to a base media layer symbol and to a second media layer symbol. Step 426_1 is followed by query step 426_2 of determining if the original base layer symbol set equals to an intersection of an original base layer symbol set and an original second layer symbol set. The original (base) second layer symbol set includes the original media layer symbols that are associated with the (base) second media layer symbol. If the answer is "no" step 426_2 is followed by step 426_3 of generating a second layer enhancement data symbol, for allowing the reconstruction of the second media layer symbol from the base media layer symbol. Step 426_3 is followed by step 426_4. If the answer is 'yes' query step 426_2 is followed by step 426_4. Step 426_4 involves generating an updated second layer symbol set. The updated second layer symbol set equals an intersection of the original base layer symbol set of the base media layer symbol and the original second layer symbol set of the second media layer symbol.

The value of the original media layer symbol from which the base media symbol was generated is used to convert the base media layer symbol to a second media layer symbol in cases where the base media layer symbol can be mapped to at least two second media layer symbols. This selection between the possible second media layer symbols is represented by a second layer enhancement data symbol. Referring to the example set forth at FIG. 1, the conversion of base media layer symbols having values of 0, 8, 16 and 24 does not require any enhancement data as each base media layer symbol of these values is mapped to a single second media layer symbol. Base media layer symbols of value 32 can be mapped to second media layer symbols having values of 28 and 35. If the value of a received original media layer symbol is 28 then the selected second layer base signal has a value of 28 and a second layer enhancement data symbol representative of an instruction "go left" is generated. If the value of the received original media layer symbol is 32 a second layer enhancement data symbol representative of an instruction "go right" is generated.

Step 426_3 of generating a second layer enhancement data is usually based upon a predefined enhancement data symbol. Predefined enhancement data symbol or symbols groups can be further compressed, represented by a code word, and the like.

Step 426 is followed by steps 428-430 that are repeated (k−3) times, for allowing to generate third till k'th layer enhancement data symbols that can be utilized to reconstruct up to (k−1)'th layer media symbols. For convenience of explanation k=4, as illustrated in FIG. 1, such that steps 428-430 allow for reconstructing the third media layer.

Step 428 is analogues to step 426 but further includes using previously generated media layer symbols to reduce the amount of generated enhancement data symbols. Step 428 includes converting each (p−1)'th media layer symbol to a p'th media layer symbol and generating p'th media layer enhancement data, if necessary, whereas the necessity also reflects the conversion "history"/previous iterations of step 428 and of step 426. Conveniently, an enhancement data symbol is generated if (A) the (p−1)'th media layer symbol can be mapped to at least two p'th media layer symbol and (B) the selection between said at least two p'th media layer symbol cannot be learnt from previous reconstruction decisions made during the current iteration of steps 426-428. The previous iterations are reflected by the content of the updated (p−1)'th layer symbol set Step 428 also Includes Increasing p.

Referring to FIG. 2, step 428 includes steps 428_1-428_4. Step 428 starts at step 426_1 of converting the original media layer symbol to a p'th media layer symbol and to a (p−1)'th media layer symbol. Step 426_1 is followed by query step 426_2 of determining if the updated (p−1)'th layer symbol set equals to an intersection of the updated (p−1)'th layer symbol set and the original p'th layer symbol set. The original p'th layer symbol set includes the original media layer symbol that are associated with the p'th media layer symbol. If the answer is "no" step 428_2 is followed by step 428_3 of generating a second layer enhancement data symbol, for allowing the reconstruction of the p'th media layer symbol from the (p−1)'th media layer symbol. Step 428_3 is followed by step 428_4. If the answer is "yes" query step 428_2 is followed by step 428_4. Step 428_4 involves generating an updated p'th layer symbol set. The updated p'th layer symbol set equals an intersection of the updated (p−1)'th layer symbol set of the (p−1)'th media layer symbol and the original p'th layer symbol set of the p'th media layer symbol.

Step 428 is followed by step 430 of checking whether p>k−1. If the answer is "no" jumping to step 428. Else, jumping to step 432 of converting the (k−1)'th media layer symbol to an original media layer symbol and generating an original layer enhancement data symbol, if necessary. The original media layer is also referred to as the k'th media layer.

Step 432 is analogues to step 426 but an original layer enhancement data symbol is generated only if the updated (k−1)'th layer symbol set includes more than a single original media layer symbol. The content of said set reflects whether (A) the (k−1)'th media layer symbol can be mapped to at least two original media layer symbols and (B) the selection between said at least two original media layer symbols cannot be learnt from previous decisions. The previous decisions can be reflected by previous media layer symbols or previous layer enhancement data symbols being generated during the generation process.

Referring to FIG. 3, step 432 includes step 432_1-432_3. Step 432_1 of converting the (k−1)'th media layer symbol to an original media layer symbol. Step 432_1 is followed by query step 432_2 of checking whether there are more than one original media layer symbol that are both (a) associated with the (k−1)'th media layer symbol and (b) included in the updated original (k−1)'th media layer symbol set. If the answer is positive then an original layer enhancement data symbol is generated during step 432_3, else no enhancement data is generated.

Conveniently, steps 424-432 are repeated for each original media layer symbol of an original media layer to provide a base media layer and enhancement data symbols for reconstructing k−1 media layers in addition to the base media layer, starting from the second media layer.

Table 1 illustrates various iterations of steps 424-432, assuming that the quantizers illustrated in FIG. 1 are utilized. Each of the right wing rows must be read from top to bottom.

| | | | | |
|---|---|---|---|---|
| Received original media layer symbol | 8 | 16 | 32 | 36 |
| Generated base media layer symbol | 8 | 16 | 32 | 40 |
| Original base layer symbol set | 4, 8 | 12, 16 | 28, 32 | 36, 40 |
| Generated second media layer symbol | 7 | 14 | 35 | 35 |
| Original second layer symbol set | 4, 8 | 12, 16 | 32, 36 | 32, 36 |
| Intersection of original base layer symbol set and original second layer symbol set | 4, 8 | 12, 16 | 32 | 36 |
| Second layer enhancement data symbol | — | — | "Go Right" (32) | "Go Left" (36) |
| Updated second layer symbol set | 4, 8 | 12, 16 | 32 | 36 |
| Generated third media layer symbol | 6 | 18 | 30 | 36 |
| Original third layer symbol set | 4, 8 | 16, 20 | 28, 32 | 36 |
| Intersection of updated second layer symbol set and original third layer symbol set | 4, 8 | 16 | 32 | 36 |
| Generated third layer enhancement data symbol | — | "Go Right" | — | — |

-continued

| | | (18) | | |
|---|---|---|---|---|
| Updated third layer symbol set | 4, 8 | 16 | 32 | 36 |
| Forth layer enhancement data symbol | "Go Right" (8) | — | — | — |

Figure 4:
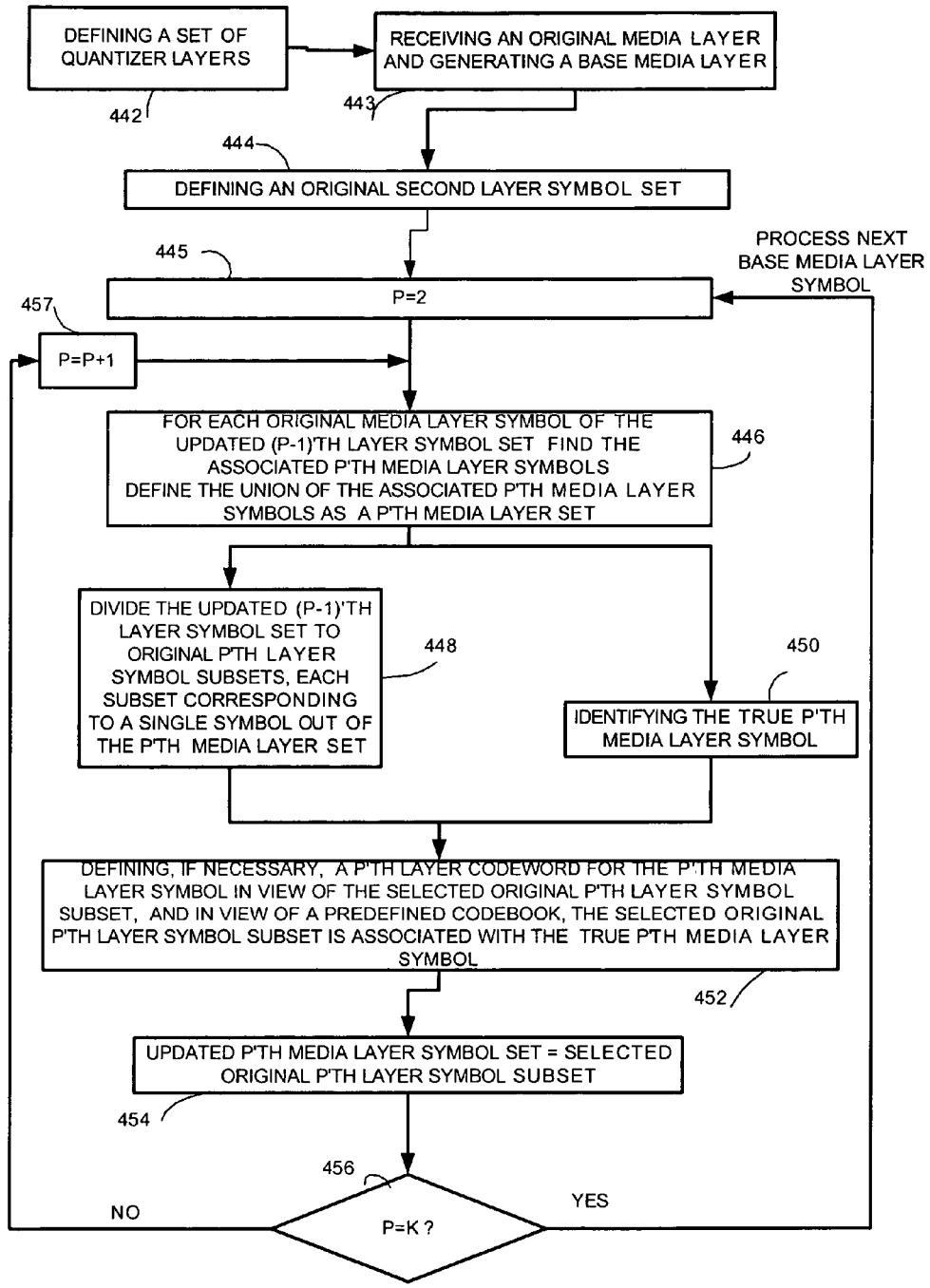
FIG. 4 is a flow chart that illustrates a method for generating a basic media layer and enhancement data, in accordance with another preferred embodiment of the invention.

FIG. 4 illustrates method 440 for generating a basic media layer and enhancement data, in accordance with another preferred embodiment of the invention.

Method 440 starts at steps 442 of defining a set of compression functions and associating between valid values of compressed representations of media streams. Referring to FIG. 1, step 442 involves defining quantizer layers. Each quantizer layer includes valid values of a media layer symbols, being represented by the quantizer layers.

Step 442 is followed by step 443 of receiving an original media layer including a plurality of original media layer symbols and generating a base media layer. Step 443 includes trans-coding the original media layer symbols to a base media layer symbols characterized by a lower size/bit rate. The trans-coding includes re-quantizing the original media layer symbols using the original and base layer quantizer values $Q_1$ and $Q_k$, $Q_1 > Q_k$.

Conveniently, the base layer quantizer can be selected, for example, such that the base media layer has minimal accepted quality or required size. Preferably, the base media layer has the same format as the original media layer. Accordingly, the same decoder being used for decoding the original media layer can be used for decoding the base media layer.

Step 443 is followed by a sequence of steps, including steps 444-457, that are repeated for each base media layer symbol of the base media layer.

The sequence starts at step 444 of defining an original second layer symbol set, that includes original media layer symbols associated with second media layer symbols. Step 444 is followed by step 445 of setting index p: p=2.

Step 445 is followed by step 446 of finding the associated p'th media layer symbols for each original media layer symbol of the updated (p−1)'th layer symbol set. The union of the associated p'th media layer symbols are defined as a p'th media layer set.

Step 446 is followed by steps 448 and 450. Step 450 of identifying the true p'th media layer symbol. The true p'th media layer symbol is calculated by re-quantizing the original media layer symbol using the original layer and p'th layer quantizers. Conveniently, the p'th media layer is represented in the same format as the original media layer, so that the same decoder used for decoding the original media layer, can be used for decoding the destination media layer. Step 448 includes the division of the original (p−1)'th layer symbol set to original p'th layer symbol subsets, each subset corresponding to a single symbol of the p'th media layer set.

Steps 448 and 450 are followed by step 452 of defining, if necessary, a p'th layer enhancement data symbol, such as a p'th layer code word. The necessity is determined in view of a selected original p'th layer symbol subset, the selected original p'th layer symbol subset associated with the true p'th media layer symbol, and in view of a predefined codebook. For example, if the subset has only a single original media layer symbol there is no need in generating any code word. If the subset has two original media layer symbols, the code word '0' can represent the first and the code word '1' can represent the second. If the subset has three original media layer symbols, '0' can represent the first, '10' the second, and '11' the third.

Step 452 is followed by step 454 of generating an updated p'th layer symbol set. The updated p'th layer symbol equals the selected p'th layer symbol subset.

Step 454 is followed by step 456 of checking whether steps 445-454 were repeated (k−1) times. If the answer is "no" step 456 is followed by step 445, else it is followed by step 457 of increasing p. Step 457 is followed by step 446.

It will be also noted that as long as $QS_{basic}/QS_{orig} \leq 2$ there are at most two valid options for the value of a coefficient in layer-i knowing its value at layer-j (where i & j are any possible layers), and so at most one signal, such as but not limited to a bit, is required to distinguish between them. Thus, the novel re-quantization overall cost required for enhancing a coefficient in the basic layer back to its original value depends only on the quantizer scales of the basic and original layers, and is given by:

$$\frac{(QS_{basic} - QS_{orig}) * 2}{QS_{basic}}$$

where $QS_{basic}$ is the base layer quantizing scale and $QS_{orig}$ is the original quantizing scale. This cost does not depend upon the number of intermediate layers and their quality.

Figure 5:
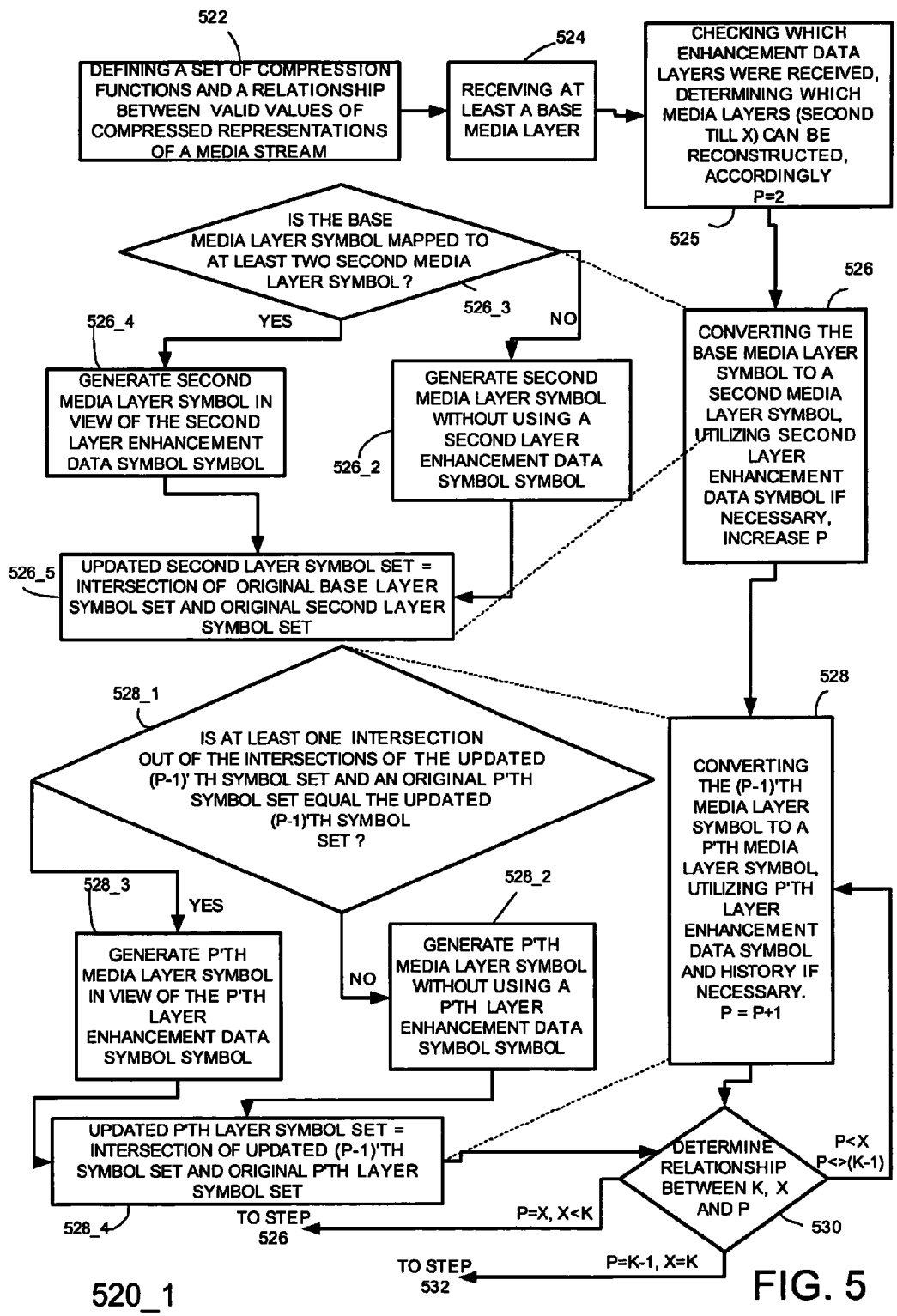
FIGS. 5-6 are flow charts that illustrate a method for reconstructing media layer symbols from a base media layer symbol and from enhancement data symbols in accordance with another preferred embodiment of the invention.
Figure 6:
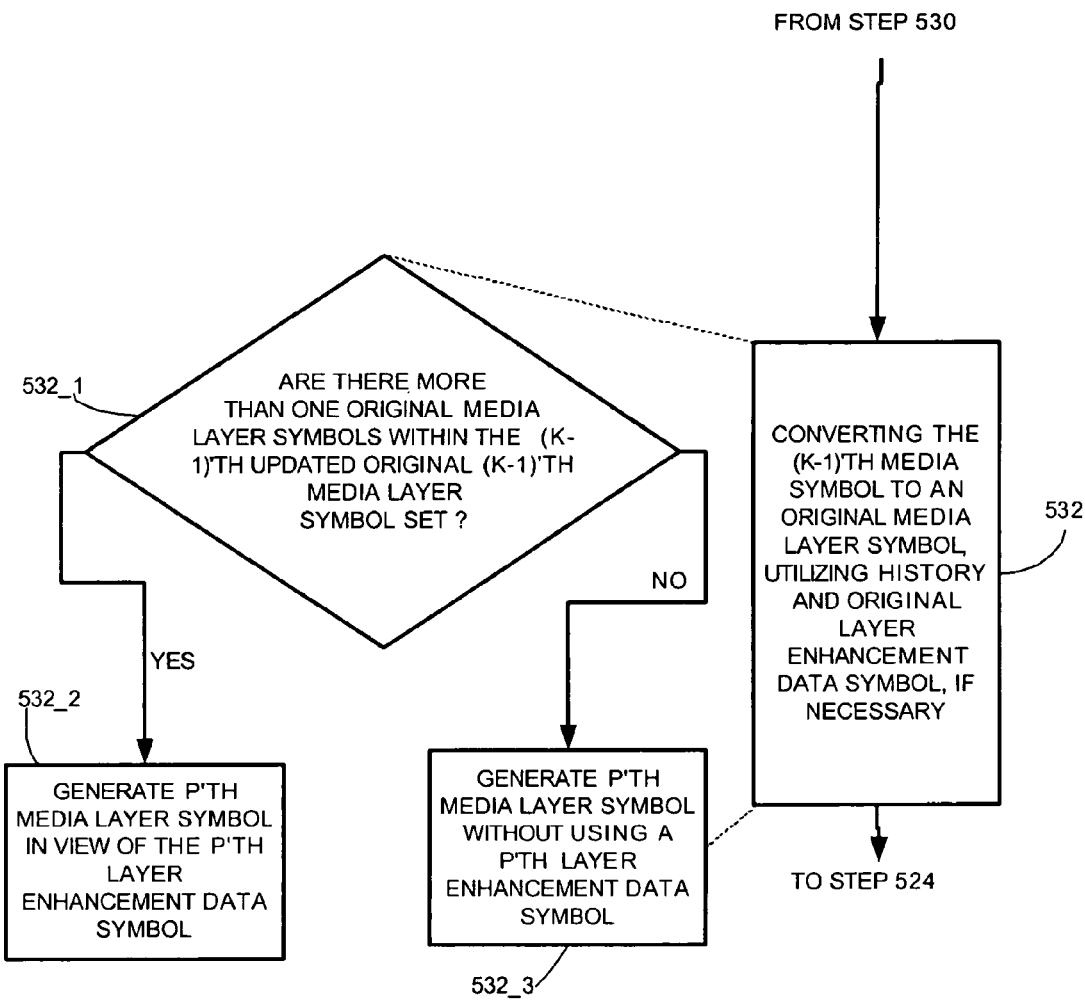

Reference is further made to FIGS. 5-6, which illustrate portions 520_1 and 520_2 of method 520 of reconstructing media layer symbols from a base media layer symbol and from enhancement data symbols.

Method 520 starts at step 522 of defining a set of compression functions and associating various valid values of compressed representations of media streams. It is noted that at the end of step 522 the decoder is aware of the compression and enhancement data generation schemes that were implemented by the encoder. Referring to the example set forth at FIG. 1, the decoder has the same compression functions and same mapping as the encoder.

Step 522 is followed by step 524 of receiving at least the base media layer symbols.

Step 524 is followed by step 525 of checking which layer enhancement data symbols were received and determining which compressed representations of the original media stream can be provided as a reconstructed media stream. A reception of base media layer in addition to the second layer till y'th layer enhancement data allow for reconstructing the second media layer till the x'th media layer, x is either equal to y or greater than y. Step 525 includes updating an index p. It is assumed that the received information allows for reconstructing the second till x'th compressed representations of the original media layer, whereas if x=k then the original media layer can be reconstructed. Usually, the decision related to a sequence of symbols, such as a frame of symbols and the like. Accordingly, distinct reconstructed media frames can be characterized by distinct compression levels.

According to an aspect of the invention, the determination of which compressed representations can be provided as a reconstructed media stream is further responsive to the additional parameters such as but not limited to the reconstructing entity/user characteristics or profile. For example, assuming that the reconstruction of high quality compressed representation required a user to pay additional fees. Accordingly users that paid the additional fees are allowed to receive a reconstructed media stream that is reconstructed from more layers than users that did not pay the fee. Accordingly, step 525 can also include checking the reconstruction entity/users profile to determine which layers can be reconstructed.

Step 525 is followed by step 526 of converting the base media layer symbol to a second media layer symbol in view of the base media layer symbol and a second layer enhancement data symbol, if necessary. As said conversion (from base media layer symbol to second media layer symbol) is the first out of possible series of conversions (from a (p−1)'th media layer to a p'th media layer, p>2), there is no additional information that reflects previous conversions of the base media layer symbol. A second layer enhancement data symbol is required if the base media layer symbol can be mapped to at least two second media layer symbols. Step 526 also includes increasing p and checking if p=x. If p<x then additional media layer symbols can be reconstructed then step 526 is followed by step 528. If p=x then step 526 is repeated for other base media layer symbols of the received base media layer.

Step 526 includes steps 526_1- 526_4. Step 526 starts at query step 526_1 of det whether a base media layer symbol can be associated with at least two second media layer symbols. If the answer is "no" step 526_1 is followed by step 526_2 of reconstructing the second media layer symbol without an enhancement data symbol. Referring to the example set forth in FIG. 1, the reconstruction involves utilizing (a) the base media layer symbol, (b) $Q_1$ and (c) $Q_2$ to generate the second media layer symbol.

If the answer is "yes" query step 526_1 is followed by step 526_3 of fetching an associated second layer enhancement data symbol to reconstruct the second media layer symbol. Referring to the example set forth in FIG. 1, the reconstruction involves utilizing (a) the fetched second layer enhancement data symbol, (b) the base media layer symbol, (c) $Q_1$ and (d) $Q_2$ to generate the second media layer symbol.

Step 528 is analogues to step 526 but allows for reconstructing media layer symbols in view of the reconstruction "history" of the received base media layer symbol—previously reconstructed lower media layer symbols. Step 528 includes converting a (p−1)'th media layer symbol to a p'th media layer symbol in view of the (p−1)'th media layer symbol and if necessary a p'th layer enhancement data symbol and/or a reconstruction "history". A p'th enhancement data symbol is required only if (A) the (p−1)'th media layer symbol can be mapped to at least two p'th media layer symbols and (B) the selection between said at least two p'th media layer symbol cannot be learned from the history—from previously generated media layer media symbols that were generated during the reconstruction of media layer symbols from the base media layer symbol of step 526.

Referring to FIG. 5, step 528 includes step 528_1-528_4. The (p−1)'th media layer symbol can be associated with more than a single p'th symbol set, and accordingly there is a need to check the relationship between each pair of one of these p'th media layer symbols and the (p−1)'th media layer symbol. If one of these relationships fulfills a predefined criterion, then there is a need to fetch a p'th layer enhancement data symbol. Checking of said relationships can be preceded by checking if the (p−1)'th media layer symbol can be mapped to more than a single p'th media layer symbol. The predefined criterion is fulfilled when the updated (p−1)'th layer symbol set does not equal the intersection of the updated (p−1)'th layer symbol set and the original p'th layer symbol set.

If one of the relationships fulfills the term, there is a need to fetch a p'th layer enhancement data symbol. In such a case step 528_1 is followed by step 528_3 of reconstructing a p'th media layer symbol from the (p−1)'th media layer symbol and a p'th layer enhancement data symbol. Referring to the example set forth in FIG. 1, step 528_3 includes fetching the p'th layer enhancement data symbol, utilizing (a) the fetched p'th layer enhancement data symbol, (b) the (p−1)'th media layer symbol, (c) $Q_{(p-1)}$ and (d) $Q_P$ to generate the p'th media layer symbol.

If the terms are not fulfilled, then step 528_1 is followed by step 528_2 of reconstructing a p'th media layer symbol from the (p−1)'th media layer symbol. Referring to the example set forth in FIG. 1, step 528_2 includes utilizing (a) the (p−1)'th media layer symbol, (b) $Q_{(p-1)}$ and (c) $Q_P$ to generate the p'th media layer symbol.

Steps 528_3 and 528_2 are followed by step 528_4 of generating an updated p'th layer symbol set. The updated p'th layer symbol set equals an intersection of the updated (p−1)'th layer symbol set of the (p−1)'th media layer symbol and the original p'th layer symbol set of the p'th media layer symbol.

Step 528 also Includes Increasing p.

Step 528 is followed by step 530 of checking the relationship between p, x and k. If x=k the original media layer symbol can be reconstructed. As the reconstruction of the original media layer symbol is slightly different from the reconstruction of other media layer symbols, if p=k−1 and x=k then step 530 is followed by step 532. If p<x then step 530 is followed by step 528. If p=x and x<k then step 530 is followed by step 526 for reconstructing other symbols from the base media layer.

Step 532 includes steps 532_1-532_3. Query step 532_1 checks if the reconstruction an original media layer symbol requires k'th layer enhancement data. The original layer enhancement data is required if: (A) the (k−1)'th media layer symbol can be mapped to at least two original media layer symbols and (B) the selection between said at least two original media layer symbols cannot be learnt from symbols of any of the previous media layers that were generated in response to a reception of the base media layer symbol from which the (k−1)'th media layer symbol was generated. Conveniently, these terms are fulfilled if the updated (k−1)'th media layer symbol set includes more than a single original media layer symbol If the answer to both (A) and (B) is "yes" step 532_1 is followed by step 532_2 of reconstructing an original (k'th) media layer symbol from the (k−1)'th media layer symbol and an original (k'th) layer enhancement data symbol. Referring to the example set forth in FIG. 1, step 532_2 includes fetching the original layer enhancement data symbol, utilizing (a) the fetched original layer enhancement data symbol, (b) the (k−1)'th media layer symbol, (c) $Q_{(k-1)}$ and (d) $Q_k$ to generate the original media layer symbol.

If the answer is "no", step 532_1 is followed by step 532_3 of reconstructing the original media layer symbol from the (k−1)'th media layer symbol. Referring to the example set forth in FIG. 1, step 532_3 includes utilizing (a) the (k−1)'th media layer symbol, (b) $Q_{(k-1)}$ and (c) $Q_k$ to generate the original media layer symbol.

Figure 7:
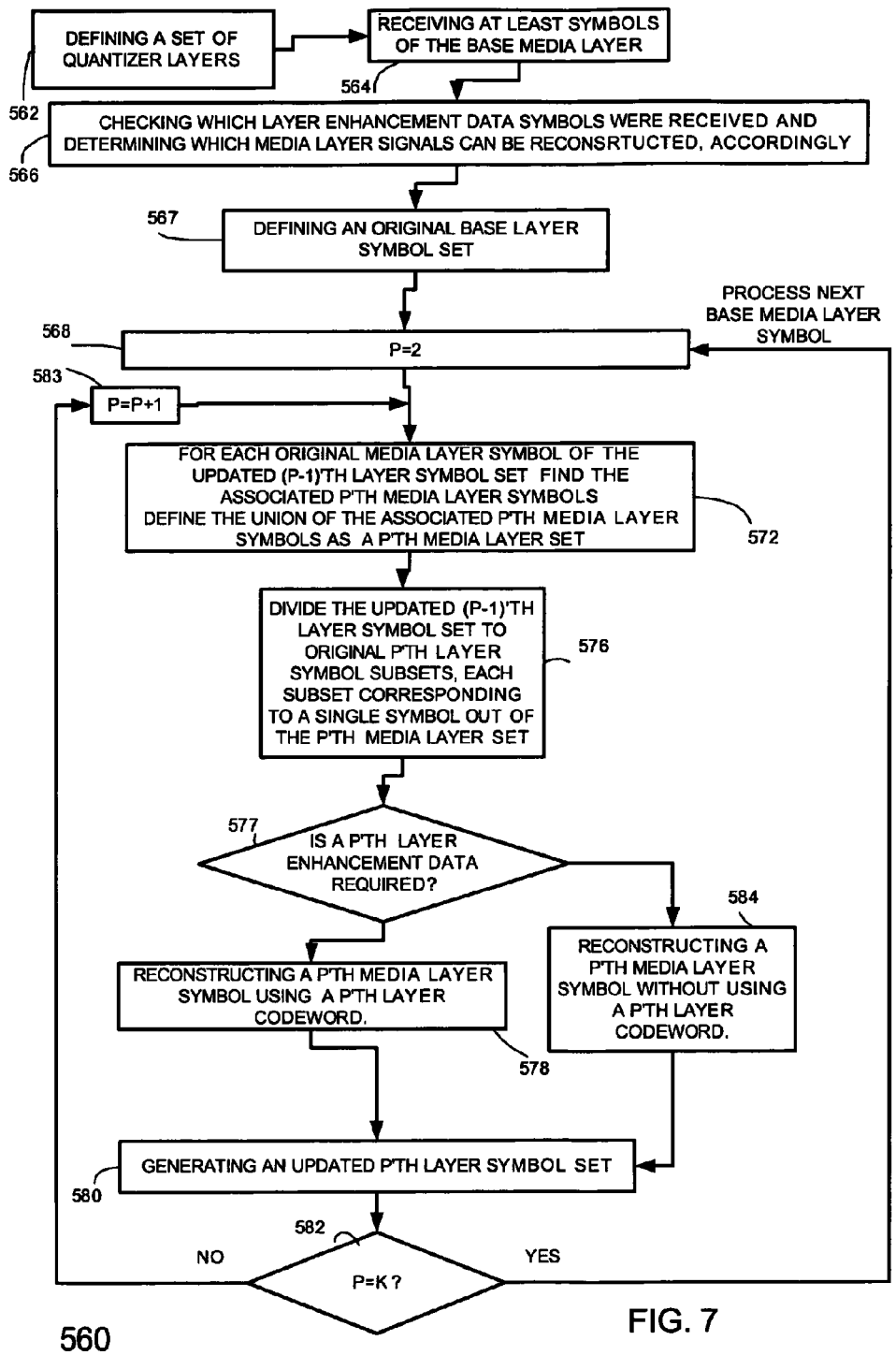
FIG. 7 is a flow chart that illustrates a method for reconstructing media layer symbols from a base media layer symbol and from enhancement data symbols, in accordance with another preferred embodiment of the invention.

Reference is further made to FIG. 7, which illustrates method 560 of reconstructing media layer symbols from a base media layer symbol and from enhancement data symbols, in accordance with another preferred embodiment of the invention. The reconstruction process starts from reconstructing the second media layer from the base media layer using second layer enhancement data, if necessary. The process continues by reconstructing additional media layers, using enhancement data and history, if necessary. The reconstruction process further requires that the decoder have the same quantizer layers and the same mapping between quantizer layer values as the encoder Method 560 starts at step 562 of defining a set of quantizer layers and determining the mapping between values of distinct quantizer layers. It is noted that at the end of step 562 the decoder has the same set of quantizers and the same mapping as the encoder.

Step 562 is followed by step 564 of receiving at least the symbols of the base media layer.

Step 564 is followed by step 566 of checking which enhancement data layer was received and determining which compressed representations of the original media stream can be provided as a reconstructed media stream. A reception of base media layer in addition to the second layer till y'th layer enhancement data allow for reconstructing the second media layer till the x'th media layer, x is either equal to y or greater than y. Step 566 includes updating an index p. It is assumed that the received information allows for reconstructing the second till x'th compressed representations of the original media layer, whereas if k=x then the original media layer can be reconstructed. Usually, the decision related to a sequence of symbols, such as a frame of symbols and the like. Accordingly, distinct reconstructed media frames can be of a distinct compression levels.

Step 566 is followed by step 567 of defining an original base symbol set for the received base media layer symbol. Step 570 includes finding the set of all possible original media layer symbols that are mapped to the base media layer symbol. Conveniently, said mapping is defined by a predefined re-quantization formula. Thus, the members of each set are all the original media layer symbols that are re-quantized to the base media layer symbol.

Step 567 is followed by a sequence of steps, including steps 568-583, that are repeated for each base media layer symbol of the base media layer.

The Sequence Starts by Step 568 of Setting Index p: p=2.

Step 568 is followed by step 572 of finding the associated p'th media layer symbols for each original media layer symbol of the updated (p-1)'th layer symbol set. For p=2 the updated set is calculated during step 567, else it is calculated during step 580.The union of the associated p'th media layer symbols are defined as a p'th media layer set.

Step 572 is followed by step 576 of dividing the original (p-1)'th layer symbol set to original p'th layer symbol subsets, each subset corresponding to a single symbol of the p'th media layer set.

Step 576 is followed by step 577 of determining if a p'th layer enhancement data symbol is required. Conveniently, said symbols are in a form of a code word. If the reconstruction requires a code word, it is fetched. Conveniently, a p'th layer enhancement data symbol is required if more than a single original p'th layer symbol subset exists.

If the answer is "yes", step 577 is followed by step 578 of reconstructing the p'th media layer symbol by utilizing the code word. Else, step 577 is followed by step 584 of reconstructing the p'th media layer symbol without a code word.

Step 578 is followed by step 580 of generating an updated p'th layer symbol set of the reconstructed p'th media symbol. The updated set equals the p'th layer symbol subset associated with the reconstructed p'th media layer symbol.

Step 580 is followed by step 582 of checking whether steps 568-580 were repeated (k-1) times: p=k?. If the answer is "yes" step 582 is followed by step 568, else it is followed by step 583 of increasing p. Step 583 is followed by step 572.

According to another aspect of the invention, the enhancement data symbols are further compressed by a variable length coding (VLC) scheme. Enhancement data symbols reflecting the relationship of more frequently appearing values will be coded by shorter VLC code words, and vice verse. Various groups of media layer symbols can be analyzed to determine the statistics. Assuming that the media layer symbols represent DCT coefficients, then the group can include adjacent DCT coefficients; DCT coefficients of different blocks, having the same frequency/position; DCT coefficients of different frames, having the same position/frequency; a combination of the above, and the like. It is known in the art that lower amplitude/value DCT coefficients are statistically more common than high value DCT coefficients. Furthermore, many DCT coefficients have a value of 0. Accordingly, if a (p-1)'th media layer symbol can be mapped to a set of p'th media layer symbols, the most frequent code word will be "go left"—mapping the (p-1)'th media layer symbol to a smallest p'th media layer symbol out of the set.

Table 2 illustrates an exemplary VLC code that can be used to VLC decode and encode enhancement data symbols when the media layer symbols represent DCT coefficients, and where up to sixteen higher layer values are associated with a single lower layer value. According to another aspect of the invention the VLC code is applied on combinations/sequences of enhancement data symbols.

TABLE 2

| Enhancement data symbol (group) | VLC decoded enhancement data symbol |
| --- | --- |
| 0000 | 00 |
| 0001 | 01 |
| 0010 | 100 |
| 0100 | 101 |
| 1000 | 110 |
| 0011 | 11100 |
| 0101 | 111010 |
| 1001 | 111011 |
| 0110 | 111100 |
| 1010 | 111101 |
| 1100 | 111110 |
| 0111 | 11111100 |
| 1011 | 11111101 |
| 1101 | 11111110 |
| 1110 | 111111110 |
| 1111 | 111111111 |

Assuming that (a) a (p-1)'th media layer symbol can be mapped to a plurality of p'th media layer symbols, (b) each of these plurality of media layer symbol has an original media layer symbol set, (c) a plurality of enhancement data symbols reflect the relationship between the (p-1)'th media layer symbol and the plurality of p'th media layer symbols, and (d) a variable length code word represents each of the plurality of media layer symbols. Then, according to yet a further aspect of the invention, the length of the code word representative of the relationship between a (p-1)'th media layer symbol and a p'th media layer symbol can be either (A) inversely proportional to the size of original p'th layer set of the p'th media layer symbol, (B) inversely proportional to an amount of yet additional enhancement data symbols required to reconstruct an original media layer symbol out of the p'th media layer symbol, or (C) inversely proportional to a complexity of reconstructing an original media layer symbol out of the p'th media layer symbol. The length can also reflect a combination of at least one of the mentioned above factors and the statistical frequency of each media layer symbol.

According to another aspect of the invention enhancement data symbol sequences are fragmented and delimitation symbols are placed between adjacent fragments of the enhancement data symbol sequences. The delimitation symbols allow for isolating each enhancement data fragment, thus preventing a reconstruction error at one fragment to effect the reconstruction based upon another fragment. A fragment can relate to symbols of an MPEG transport packet, a PES packet, a frame, a group of blocks, macroblocks and the like. The delimitation symbols can also be used to detect inconsistencies in the transmission and/or reception of frames and to align enhancement data frames to the relevant base media layer frames.

According to yet a further aspect of the invention the layered representation of the data can be utilized to enhance the security of the data. The base media layer can be transmitted via a first communication channel while the enhancement data layers can be transmitted via at least one distinct communication channel.

According to another aspect of the invention a complexity/cost of a secure transmission and storage of an original layer media stream can be reduced, as encrypting the base media layer stream or an enhancement media layer alone will suffice.

Figure 8:
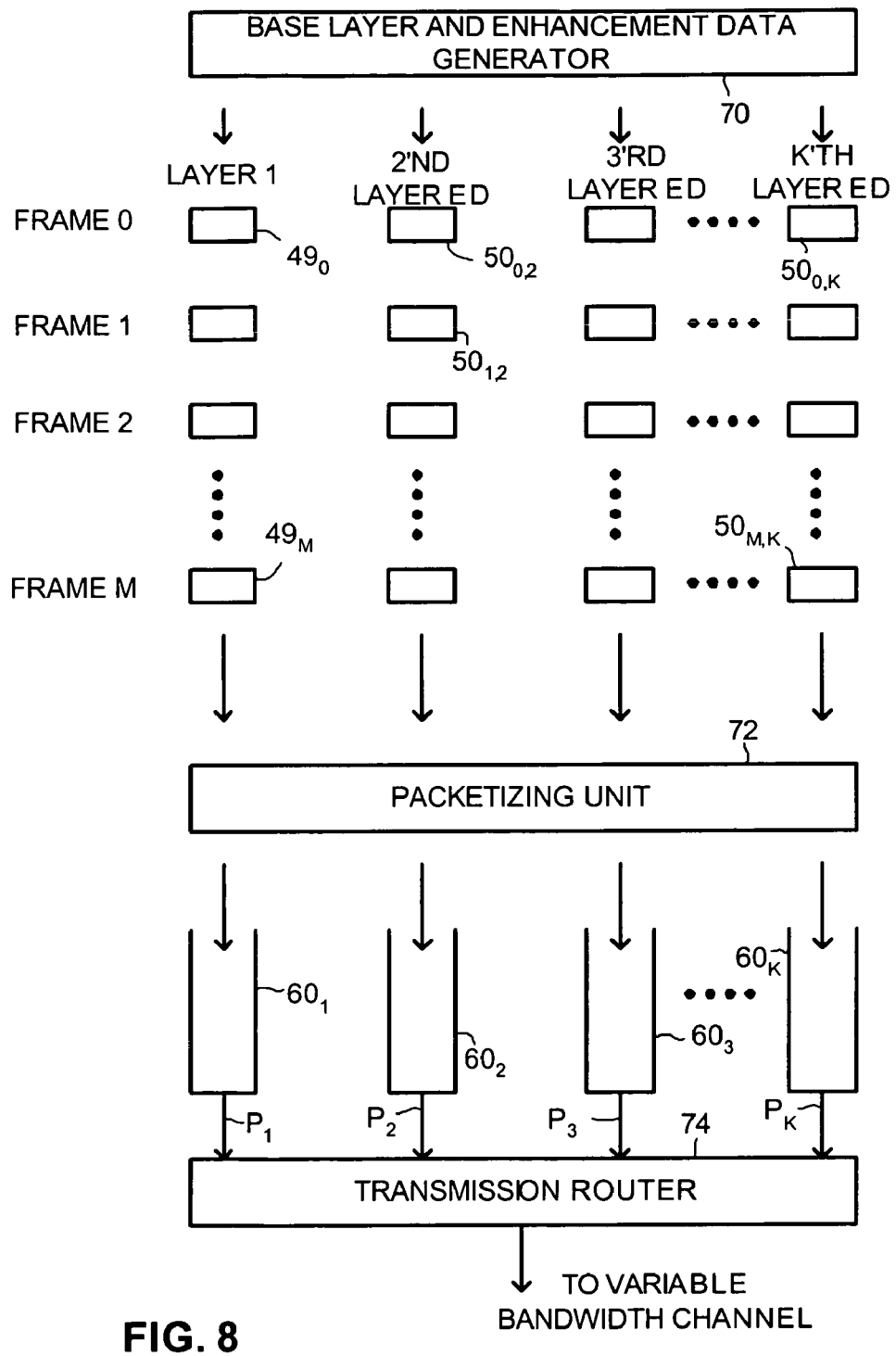
FIG. 8 is a representation of a packetization structure, in accordance with a further preferred embodiment of the present invention.

Reference is further made to FIG. 8, which is a representation of a layering and packetizing mechanism structure, constructed and operative in accordance with a further preferred embodiment of the present invention. The structure includes a base layer and enhancement data generator 70, a packetizing unit 72, a plurality of queues, generally referenced 60 and a transmission router 74.

For convenience of explanation it is assumed that sequences of original media layer symbols, base media layer symbols and enhancement data symbols are arranged in frames.

Each received original media layer frame representation is converted to a base media layer frame representation and plurality of layer enhancement data symbol frame representations, the former generally referenced $49_i$ and wherein each of the latter generally referenced $50_{ij}$, where i denotes a frame index and j denotes an enhancement data layer index. The index i ranges between 0 to M, index j ranges between 2 and k, whereas the k'th media layer is the original media layer. For example, a second media layer frame can be reconstructed from a base media layer frame and if necessary from a second layer enhancement data frame representation $50_{0,2}$.

The frame representations $50_{ij}$ and $49_i$ are arranged in such a structure, so that each can be accessed individually, thereby enabling reconstruction of the original media layer frames stream in a variety of ways, at different qualities, which can vary from frame to frame.

Packetizing unit 72, encapsulates the frame representations so that the original stream can be constructed from only some of them, where some packets are discarded. This aspect of the invention provides robustness, in situations where bandwidth decreases, and not all of the frame representations of a selected picture arrive in due time at the receiving end.

The packetizing unit 72 packetizes the frame representation, respective of a selected layer and provides the packets to respective layer queues $60_1$, $60_2$, $60_3$ and $60_k$. Queue $60_1$ stores frame representations $50_{ij}$ while queues $60_j$ store j'th enhancement data frame (referred to as J'TH ED LAYER) representations.

At this stage, the packets from each selected ones of the queues are routed to an assembly unit. Many methods for routing packets are known in the art, each can be used for routing packets from the queues, according to a given priority scheme, such as random early detection (RED), weighted random early detection (WRED), and the like.

According to the present invention, the queues are managed according to a priority scheme, in which the base layer queue $60_1$ is assigned the highest priority $P_1$ and consecutive queues $60_2$, $60_3$ and $60_k$ are assigned respective descending priorities $P_2$, $P_3$ and $P_k$.

A packet within a queue, which was not transmitted within a predetermined period of time, is discarded and hence deleted, making room for new packets at the respective layer. This can be achieved in a plurality of ways. For example, each packet is assigned an expiration time stamp, before which the packet is considered valid for transmission and after which the packet can be discarded and deleted. The transmission router 74 collects packets from the queues 60, according to the priority scheme and transmits them over a communication medium such as but not limited to a variable bandwidth channel.

The transmitted frames are also referred to as a transmitted representation of the media stream, and include base media layer and if necessary enhancement data layers. The bandwidth of the transmitted representation of the media stream does not exceed an available bandwidth of the communication medium.

Figure 9:
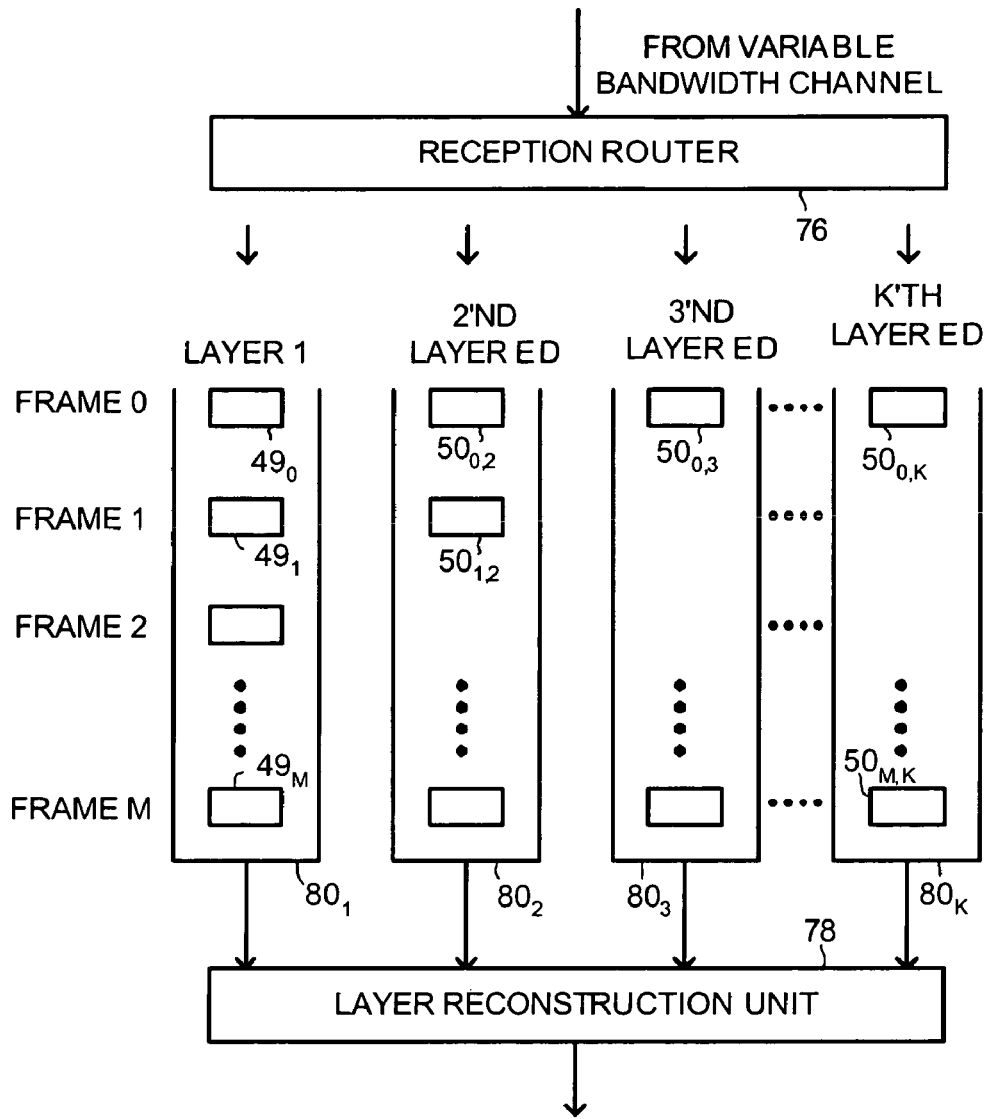
FIG. 9 is a schematic illustration of an assembly mechanism structure, constructed and operative in accordance with another preferred embodiment of the present invention.

Reference is further made to FIG. 9, which is a schematic illustration of a reconstruction mechanism structure, constructed and operative in accordance with another preferred embodiment of the present invention. The structure includes a reception router 76, a media layer reconstruction unit 78 and a plurality of queues, generally referenced 80.

The reception router 76 receives a plurality of packets from the variable bandwidth and distributes them according to the respective layers, among queues $80_1$, $80_2$, $80_3$ and $80_k$. Base layer packets are directed to queue $80_i$, j'th layer enhancement data symbol packets are directed to queue $80_j$.

As presented in the example of FIG. 9, not all of the packets in each of the layers have arrived at a selected point in time, at the receiving end. With respect to the base layer, all of the frames have arrived. With respect to second layer enhancement data, the packets respective of frame 0, frame 1 and frame M have arrived. With respect to third till k'th layer enhancement data, the packets respective of frame 0 and frame M have arrived and the packets respective of frames 1 and 2 have not.

Assuming that k=4, and the enhancement data is required for the reconstruction of the third media layer of frame 1 and for the reconstruction of the second media layer of frame 2 then the output pictures for frames 0 and M can be provided at the highest quality, the output picture for frame 1 can be provided at the second lowest quality and the output picture for frame 2 can only be provided at the lowest quality. Additional media layer frames can be reconstructed if enhancement data is not required. For example, the third media layer of frame 1 can be reconstructed if the reconstruction does not require third layer enhancement data.

Media layer reconstruction unit 78 retrieves the base layer frame representation and the layer enhancement data frame representations from all of the queues 80 and produces a media stream at the output thereof. Media layer reconstruction unit 78 includes a decoder while base layer and enhancement data generator 70 includes an encoder.

Figure 10:
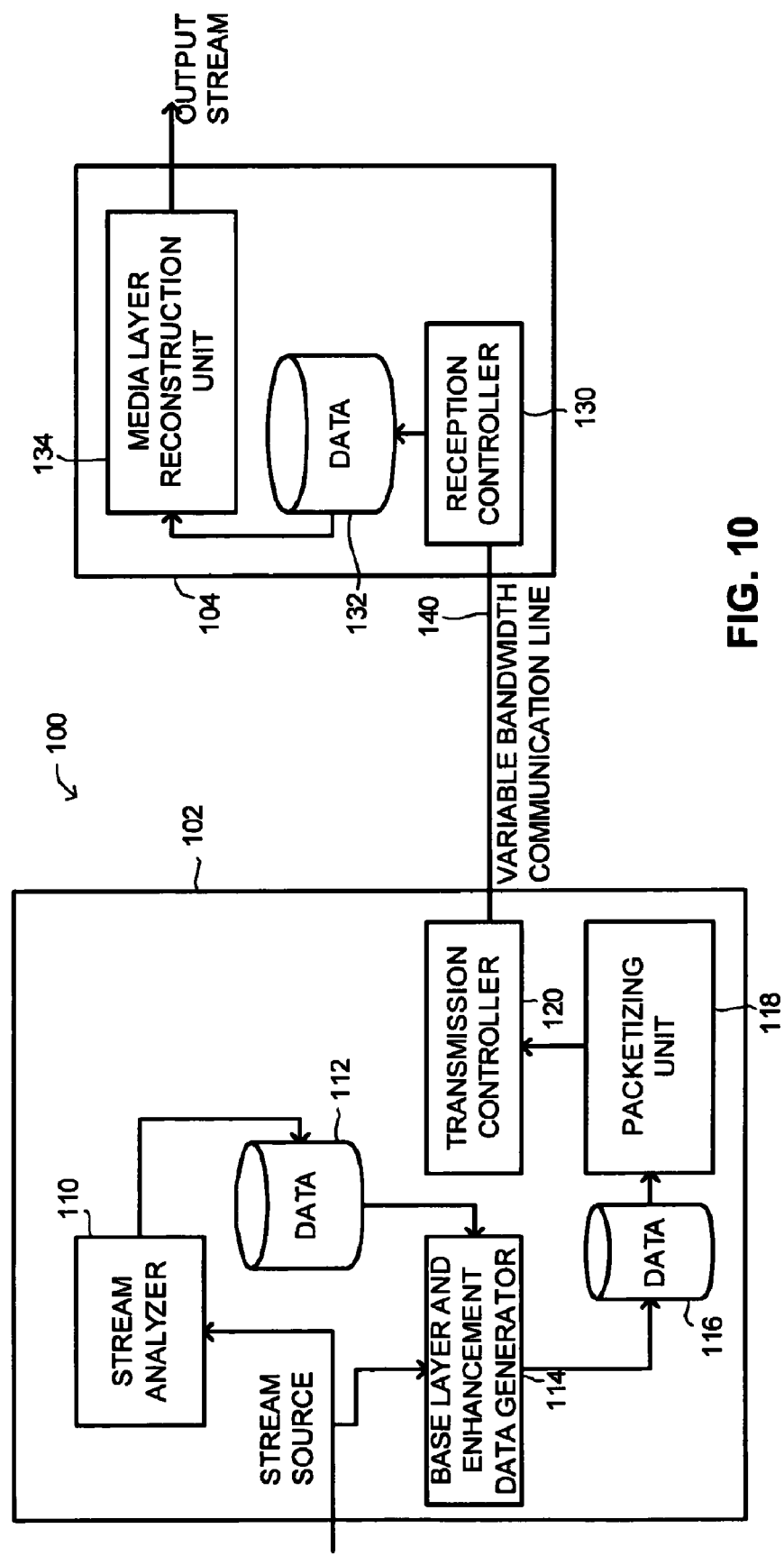
FIG. 10 is a schematic illustration of an apparatus, constructed and operative in accordance with another preferred embodiment of the present invention.

Reference is now made to FIG. 10, which is a schematic illustration of an apparatus, generally referenced 100, constructed and operative in accordance with another preferred embodiment of the present invention. FIG. 10 provides an overview of an entire apparatus for transmitting and receiving a media stream over a variable bandwidth channel.

Apparatus 100 includes a transmission system 102 and a reception system 104. Transmission system 102 includes a stream analyzer 110, a compression instruction storage unit 112, a base layer and enhancement data generator 114, a base layer and enhancement layer storage unit 116, a packetizing unit 118 and a transmission controller 120. Compression instruction storage unit 112 is connected to stream analyzer 110 and to a base layer and enhancement data generator 114. Base layer and enhancement data storage unit 116 is connected between base layer and enhancement data generator 114 and packetizing unit 118. Packetizing unit 118 is further connected to transmission controller 120. Stream analyzer 110 and base layer and enhancement data generator 114 are both connected to a stream source.

Reception system 104 includes a reception controller 130, a storage unit 132 and a media layer reconstruction unit 134. Storage unit 132 is connected to reception controller 130 and to media layer reconstruction unit 134. Reception controller is connected to transmission controller via a variable bandwidth channel, referenced 140.

It is noted that transmission system 102 and reception system 104 can be located at two ends of a communication channel of any given distance or can co-exist in the same machine, such as for retransmission purposes.

Stream analyzer 110 receives a media stream, which can include a video stream, an audio stream, a media command stream or a data stream. Stream analyzer 110 processes the stream and determines a set of compression command, which are directed at multi-layer compression of the received media stream, in accordance with a plurality of requirements such as minimal quality limit, minimal bandwidth limit, and the like.

The set of compression commands is then stored in layer structure storage unit 112. Referring to the example set forth in FIG. 1, the set of compression commands can reflect the selection of some of quantizer layers L1-L4 and the mapping between their values.

Base layer and enhancement data generator 114 retrieves the set of commands from storage unit 112 and compresses the incoming media stream, according to the quantizing scale values set forth by stream analyzer 110. It is noted that the incoming media stream can either be non-compressed or compressed media stream (such as an MPEG compressed stream). Base layer and enhancement data generator 114 stores the produced layers in base layer and enhancement data storage unit 116.

Packetizing unit 118 retrieves portions of the layers stored in base layer and enhancement data storage unit 116 and produces packets which are then transmitted by transmission controller 120 to reception controller 130, via channel 40. Reception controller 130 stores the received packets in storage unit 132. Base layer and enhancement data assembler 134 retrieves frame representations of base layer and various layer enhancement data, from the packets in storage unit 132 and reassembles a valid media stream therefrom. It is noted that this valid media stream is at most at the quality of the incoming media stream, provided to stream analyzer 110.

Figure 11:
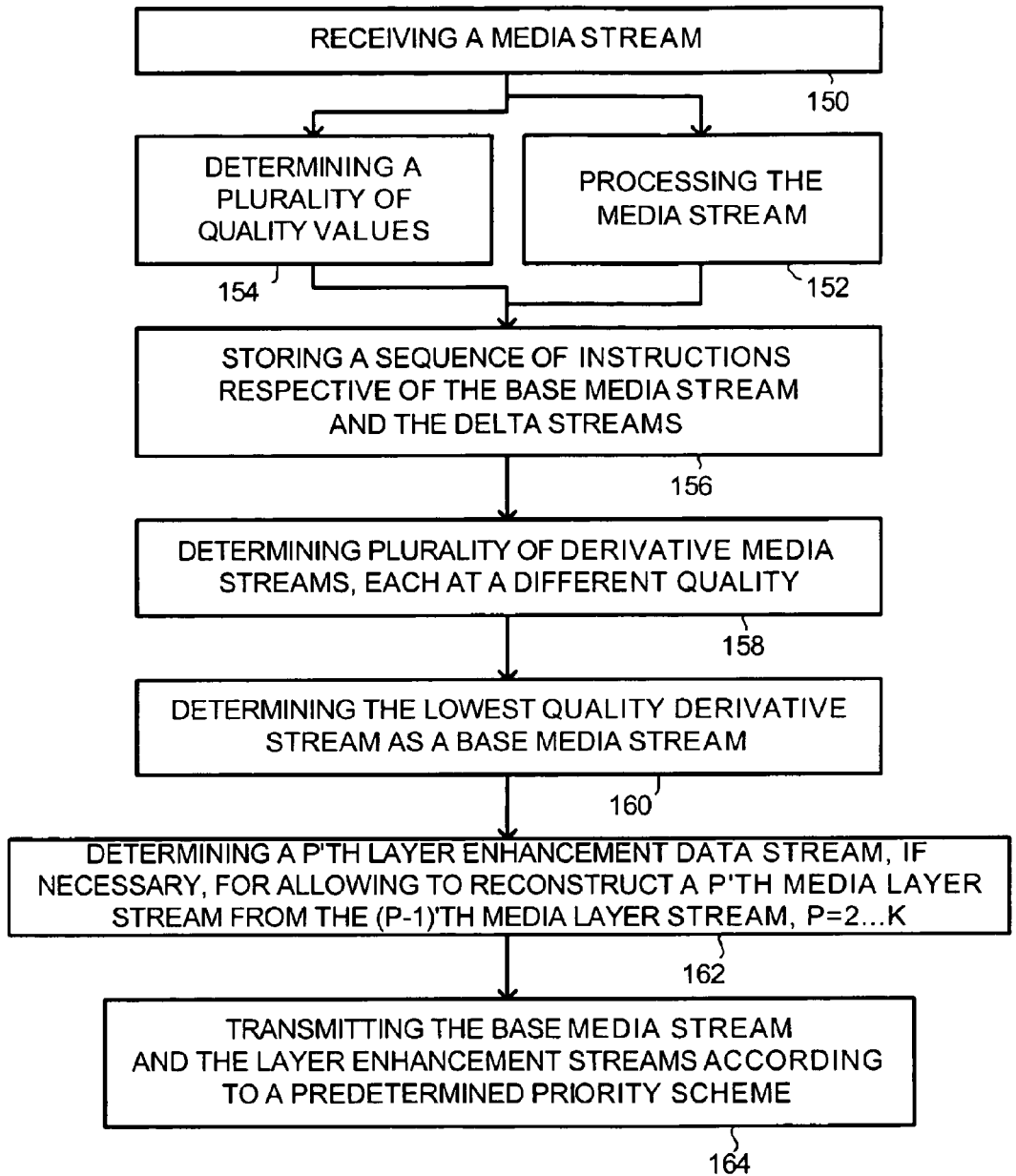
FIG. 11 is an illustration of a method for operating the transmission system of the apparatus of FIG. 10, operative in accordance with another preferred embodiment of the present invention.

Reference is further made to FIG. 11, which is an illustration of a method for operating the transmission system of the apparatus of FIG. 10, operative in accordance with another preferred embodiment of the present invention. It is noted that the steps as listed in conjunction with this method are described for a single media stream. Nonetheless, as will be described further below, these steps apply for a structure, which processes a plurality of media streams and combines them for joined transmission over a single communication line.

In step 150, a media stream is received. With reference to FIG. 10, stream analyzer 110 receives a media stream. The media stream is provided either in a full or in a compressed format. In case where the received stream is provided in an analog format or in a digitized non-compressed format, then, preliminary digitization and compression procedures can be applied thereon.

The received media stream is processed (step 152) and a plurality of quantizing values, respective of quality values, are determined (step 154). With reference to FIG. 10, stream analyzer 110 processes the media stream and determines preliminary parameters, which will be later used in the layering procedure. These values can be stored in storage unit 112 or used immediately (step 156).

In step 158, a plurality of derivative media layer streams are determined, each at a different quality, according to a respective quantizing value. It is noted that the quantizing value can be determined for each frame or even each macro-block.

In step 160, the lowest quality derivative stream is determined as a base media level stream. With reference to FIG. 10, the base layer and enhancement data generator 114 determines the highest quantizing value stream as a base media layer stream.

In step 162, a p'th layer enhancement data stream is determined, if necessary, between each (p−1)'th and p'th layer intermediate media stream, p=2, . . . k. The base layer and the p'th layer enhancement data stream can further undergo a packetizing procedure, with respect to predetermined communication or transport protocols, by packetizing unit 118. The p'th layer enhancement data stream may further undergo compression using various compression schemes such as VLC schemes and the like.

In step 164, the base layer media stream and the respective enhancement data layers are transmitted over a communication channel, according to a predetermined priority scheme. With reference to FIG. 10, the transmission controller transmits the base and enhancement data layers over the variable bandwidth transmission line 140.

Figure 12:
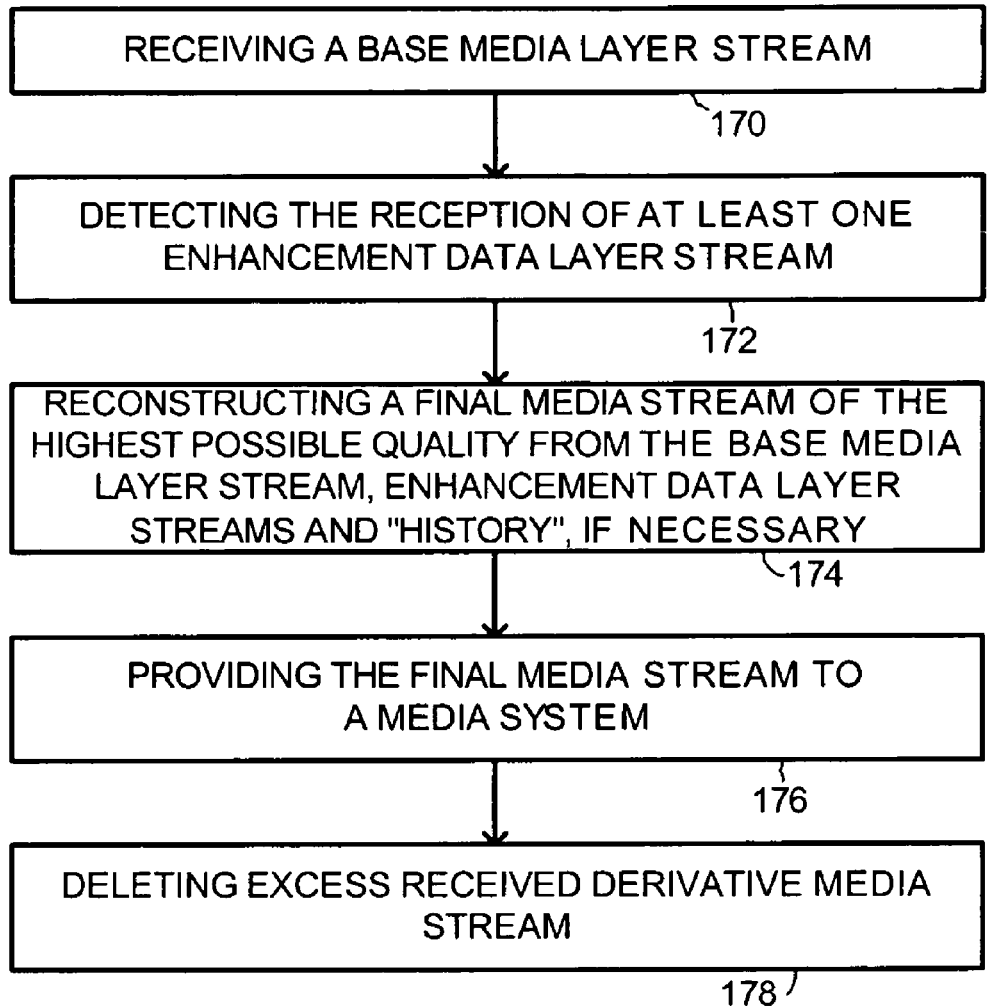
FIG. 12 is an illustration of a method for operating the reception system of the apparatus of FIG. 10, operative in accordance with another preferred embodiment of the present invention.

Reference is further made to FIG. 12, which is an illustration of a method for operating the reception system of the apparatus of FIG. 10, operative in accordance with another preferred embodiment of the present invention.

In step 170, a base media stream is received. It is noted that the compression of the base media stream is directed to comply at all times with the minimal bandwidth, which is available over the communication line. With reference to FIG. 12, the reception controller 130 receives a plurality of packets, which comprise the base layer respective of the lowest quality media stream.

In step 172, the reception of at least one enhancement data layer stream is detected. With reference to FIG. 10, the reception controller 130 detects the presence of incoming packets, respective of enhancement data layers, allowing for reconstructing higher media layer streams than the base media layer. It is noted that the base media layer packets as well as any received enhancement data packets can be stored in storage unit 132.

In step 174, intermediate and even original media layer frames are reconstructed from base media layer frames and enhancement data frames, if necessary. The reconstruction can also be based upon previous reconstruction decisions. Each base, intermediate and original layer forms a valid media stream. With reference to FIG. 10, the media layer reconstructing unit 34 retrieves packets from storage unit 132 and reconstructs a valid media stream therefrom. The media layer reconstructing unit is also configured to store previous reconstruction decisions, to be retrieved during current reconstruction decisions.

In step 178, excess derivative media information is deleted. With respect to FIG. 12, the reception controller deletes received packets which were not used during media stream reconstruction and the transmission controller 120 discards packets, which were not transmitted within a predetermined time period.

It is noted that the above scheme can be applied to any bit-costly aspect, such as include or exclude fields, temporal resolution, spatial resolution, luminance or chrominance, and a combination thereof.

In accordance with another aspect of the present invention, there is provided a method, which manages the transmission of a plurality of media streams over a single communication line.

Figure 13A:
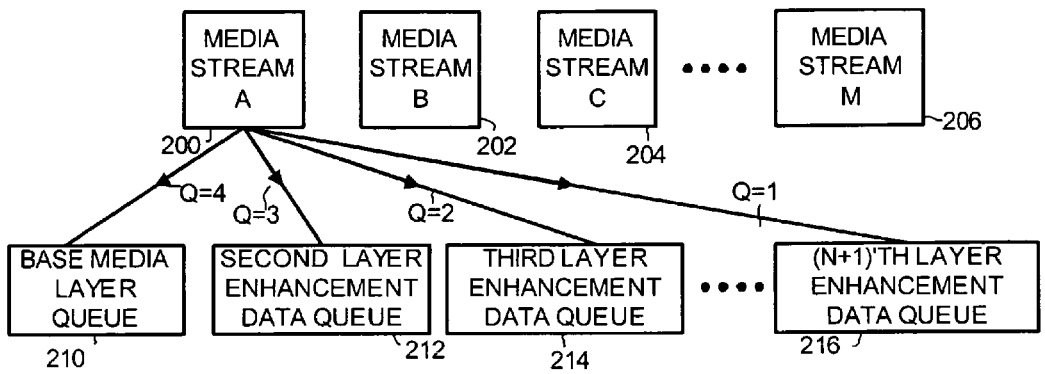
FIGS. 13A, 13B, 13C and 13D, each provide a schematic illustration of the distribution of a base media stream and different layer enhancement data on the same set of layers, at different quantizing values.

Reference is to FIGS. 13A, 13B, 13C and 13D, each providing a schematic illustration of the layering distribution of a different media stream on the same set of layers, at different quantizing values. With reference to FIG. 13A, the streams to be processed include M media streams, referenced 200 (media stream A), 202 (media stream B), 204 (media stream C) and 206 (media stream M). The layer structure includes a base media layer and additional (k−1) layer enhancement data for reconstructing at least k media layers respectively, arranged in k queues referenced 210 (base media queue), 212 (second layer enhancement data queue), 214 (third layer enhancement data queue) and, 216 (k'th layer enhancement data queue).

Media stream A 200 is processed according to the following exemplary quantizing values Q=4 (base media layer stored in queue 210), Q=3 (second layer enhancement data stored in queue 212), Q=2 (third layer enhancement data stored in queue 214) and Q=1 (k'th layer enhancement data stored in queue 216), which ultimately yields the original, highest quality media stream, as received before processing.

Figure 13B:
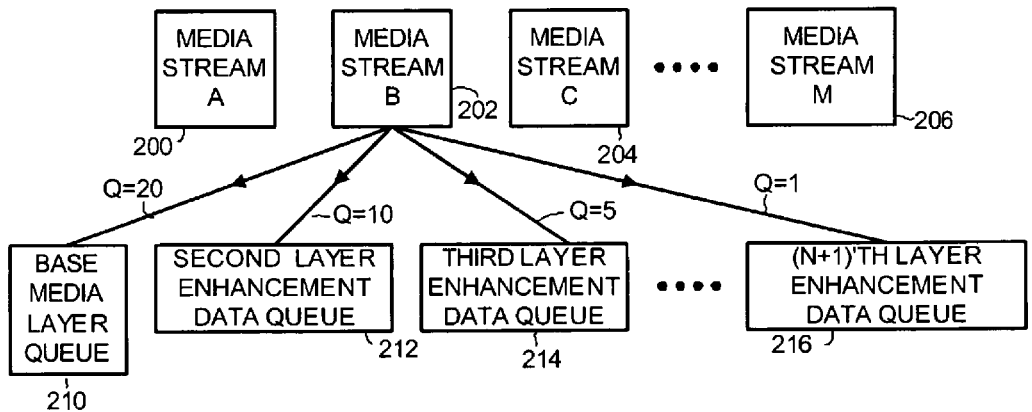

With reference to FIG. 13B, media stream B 202 is processed according to the following quantizing values Q=20 (base media layer stored in queue 210), Q=10 (second layer enhancement data stored in queue 212), Q=5 (third layer enhancement data stored in queue 214) and Q=1 (k'th layer enhancement data stored in queue 216).

It is noted that, statistically, the arrangement as presented in FIGS. 13A and 13B provides higher quality priority to media stream A over media stream B, which at the base layer is compressed according to a quantizing value of Q=4, guaranteed to be received at the receiving end, where media stream B is compressed at a quantizing value of Q=20 at the base layer and only the second delta layer represents a compression at a quantizing value of Q=5. This inherent characteristic of the present invention provides a user with control over the priority, regarding quality, which can be set for each of the media streams, before transmission.

Figure 13C:
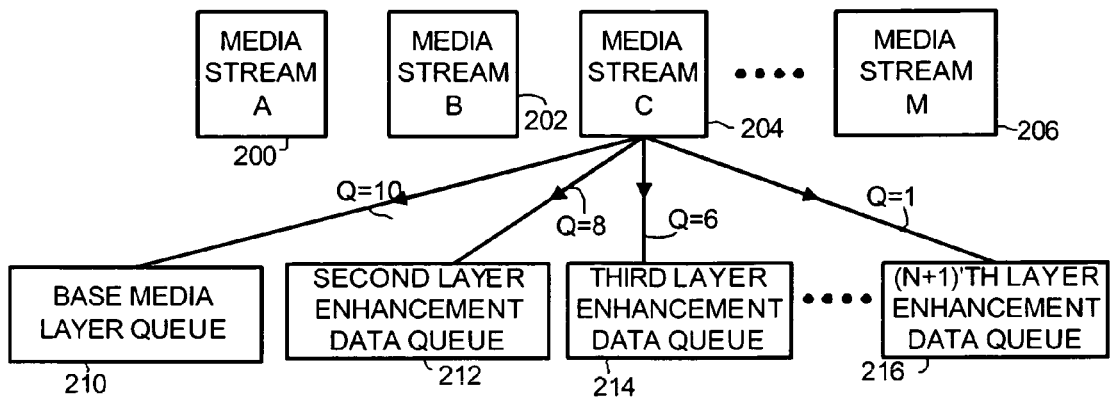

With reference to FIG. 13C, media stream C 204 is processed according to the following exemplary quantizing values Q=10, Q=8, Q=6 and Q=1. Comparing with the quantizing schemes of FIGS. 13A and 13B, the "upgrading" scheme of each of the streams, can also be prioritized, where the first delta layer of one stream is quantized at a higher level than that of another stream, thus ensuring that given a selected bandwidth, one stream will be reconstructed at a higher quality than the other.

Figure 13D:
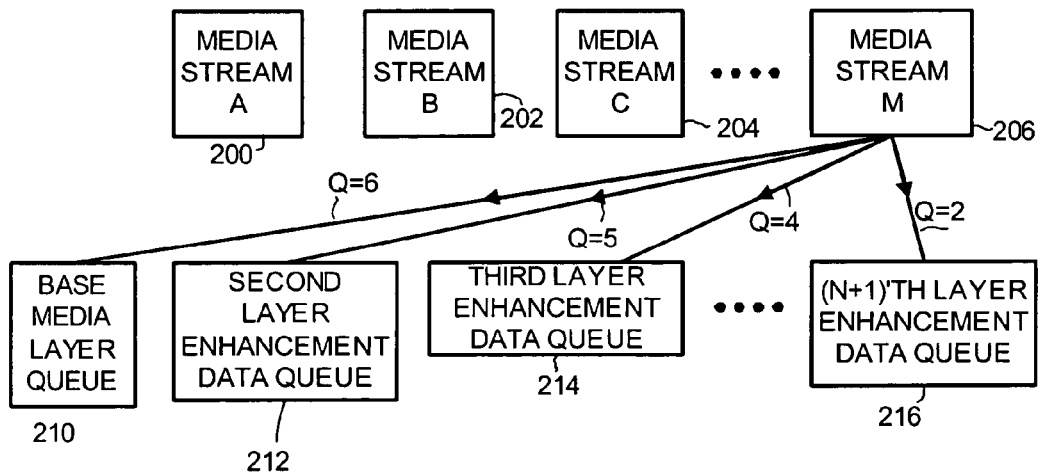

With reference to FIG. 13D, media stream M 206 is processed according to the following quantizing values Q=6, Q=5 Q=4 and Q=2. This layer quantizing scheme assumes that a bandwidth, suitable for Q=1 will most probably not be available, but a bandwidth for Q=2 will be. In that case, the highest delta layer is compressed at Q=2 rather than Q=1.

Figure 14:
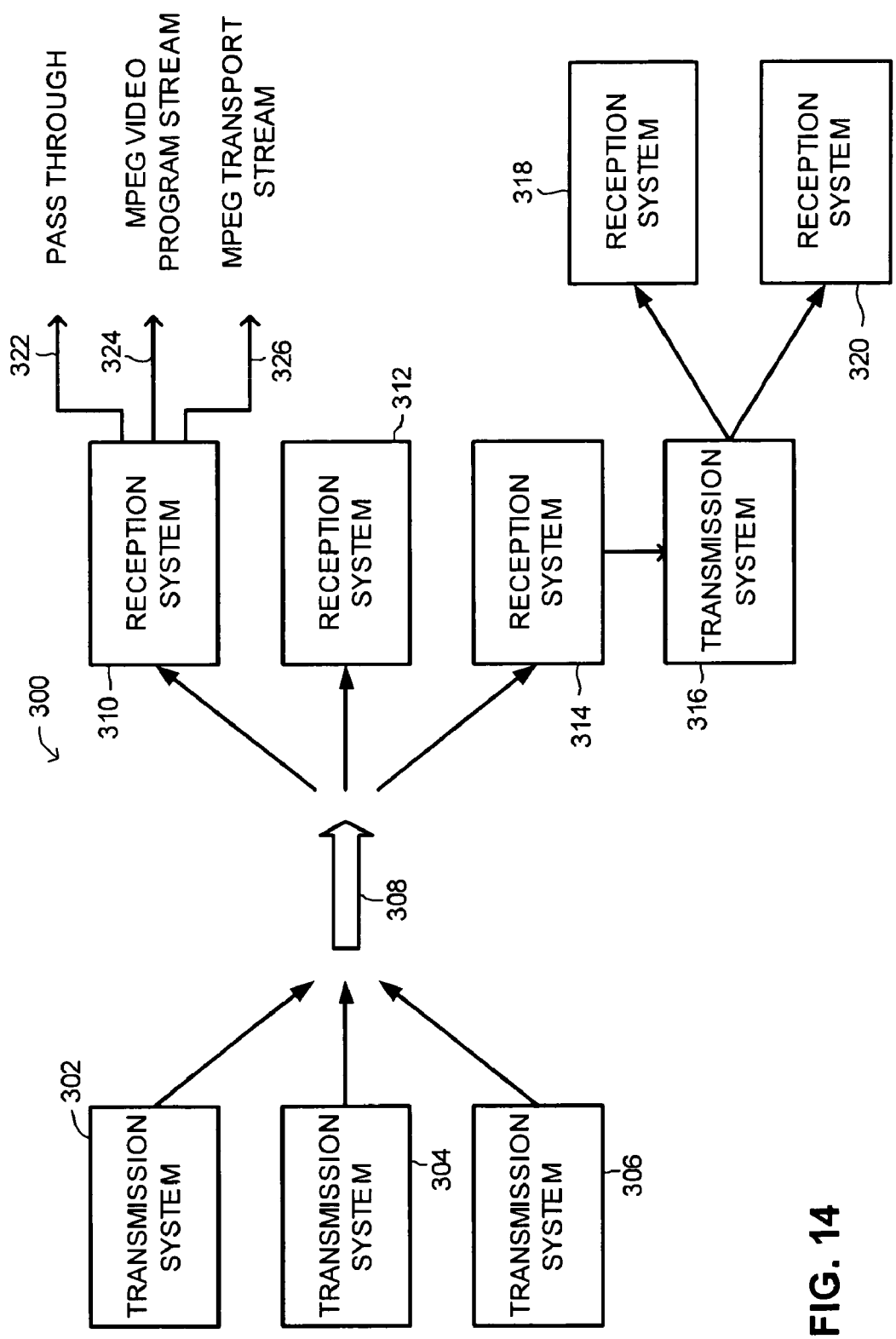
FIG. 14 which is a schematic illustration of an apparatus, down streaming media through a plurality of communication channels, constructed and operative in accordance with another preferred embodiment of the present invention.

Reference is now made to FIG. 14, which is a schematic illustration of an apparatus, generally referenced 300 for down streaming media through a plurality of communication channels, constructed and operative in accordance with another preferred embodiment of the present invention. System 300 includes a plurality of transmission systems 302, 304, 306 and 316 and a plurality of reception systems 310, 312, 314, 318 and 320. Each of the transmission system 302, 304 and 306 processes a plurality of media streams at a plurality of quantization levels to provide base media layer streams and a plurality of layer enhancement data when necessary and transmits them over a high capacity channel, generally referenced 308, to reception systems 310, 312 and 314. It is noted that each of the transmissions of each of the transmission systems 302, 304 and 306 can be received at any of the reception systems 310, 312 and 314.

Each of the reception systems 310, 312 and 314 can provide the received data in a plurality of formats such as 'pass through', referenced 322 (e.g., the data is resent without alteration), MPEG video program stream, referenced 324 or a converted MPEG transport stream, referenced 326.

It is noted that the received data can further be processed into new base media layer and enhancement data layers and transmitted further to a new location over a multi-channel network. An example is set by transmission system 316, which receives an assembled media stream from reception system 314. Transmission system 316 processes the received media stream into a base media layer and enhancement data allowing for reconstructing a plurality of media layers and further transmits the base media layer and the enhancement data layers to reception systems 318 and 320. It is noted that the quality of the result of this further transmission cannot exceed the quality of the streams as received by reception system 314.

Reference is now made to FIG. 15, which is a schematic illustration of a video re-multiplexing system, generally referenced 350, constructed and operative in accordance with another preferred embodiment of the present invention.

System 350 includes a plurality of stream processors 352A, 352B, 352C and 352N, a plurality of queue units 358A, 358B, 358C, 358D and 358N, a router 360, a control unit 362, a media layer reconstruction unit 364, a packetizing unit 366 and a media decoder array 368.

Each of stream processors 352A, 352B, 352C and 352N includes a stream analyzer unit, generally referenced 354 and a base layer and enhancement data generator, generally referenced 356, respectively connected there between.

Each of stream processors 352A, 352B, 352C and 352N is connected to queues 358A, 358B, 358C, 358D and 358N. It is noted that each of the stream processors can produce a base layer and enhancement data for allowing to reconstruct media layers at a number, which does not exceed the number (N) of the queues.

Queues 358A, 358B, 358C, 358D and 358N are all connected to router 360. It is noted that router 360 can be replaced with a respective switch, for enhanced speed. Router 360 is further connected to control unit 362 and to media layer reconstruction unit 364. Media layer reconstruction unit 364 is further connected to media decoder array 368 and to packetizing unit 366.

Each of stream analyzers 354A, 354B, 354C and 354N receives a media stream from a respective stream source. Each stream analyzer analyzes the received media stream and determines how and to what extent should that stream be layered. The decision can be performed according to a plurality of parameters such as the complexity of the information embedded in the stream, the priority which this stream has over the rest of the media streams, the allocated media stream bandwidth, the allocated overall communication channel bandwidth, and the like.

The base layer and enhancement data generators 356, connected to each of the stream analyzers 354 generates the base media layer and the enhancement data. Each stream processor 352 then distributes the base media layer and the enhancement data between the queues 358A, 358B, 358C, 358D and 358N, where the base layer from each layering generator is stored in queue 358A, the second layer enhancement data is stored in queue 358B and so on. Router 360 retrieves data from each of the queues 358A, 358B, 358C, 358D and 358N, according to a multiplexing scheme received from the control unit 362.

Media layer reconstruction unit 364 reconstructs each of the streams to the extent available with respect to the retrieved layers. It is noted that the content of some queues, of higher order (higher layers) can be discarded, in accordance with a plurality of parameters such as time limit (priority, urgency), volume limit (bit size), importance criterions and the like. Media layer reconstruction unit 364 provides the reassembled streams in an encoded format as output.

Media layer reconstruction unit 364 further provides the reassembled streams to packetizing unit 366 and to media decoder array 368. Packetizing unit 366 encapsulates portions of the reassembled streams, according to any desired communication protocol such as Ethernet, ATM, TCP/IP, MPEG-Transport and the like. Media decoder array includes a plurality of decoding units (not shown) each decoding a selected one of the streams and providing it as output in the form of a media stream. Accordingly, the system 350 operates a stream multiplexer, which is able to multiplex a plurality into a given bandwidth, CBR or VBR, without wasting any bandwidth volume.

It is noted that the method and apparatus according to the present invention can be implemented either in hardware, in software or in a combination thereof.

It will be apparent to those skilled in the art that the disclosed subject matter may be modified in numerous ways and may assume many embodiments other then the preferred form specifically set out and described above.

Accordingly, the above disclosed subject matter is to be considered illustrative and not restrictive, and to the maximum extent allowed by law, it is intended by the appended claims to cover all such modifications and other embodiments, which fall within the true spirit and scope of the present invention.

The scope of the invention is to be determined by the broadest permissible interpretation of the following claims and their equivalents rather then the foregoing detailed description.

We claim:

1. Method for defining a compression scheme of a media stream, the method comprising the steps of:
   determining a plurality of compression levels for the media stream and a relationship between valid values of compressed representations of the media stream, each compressed representation of the media stream associated with one of the compression levels;
   defining the highest level of compression of the compression levels as a base level; and
   defining enhancement data for representing a relationship between valid values of the compressed representations of the media stream.

2. The method according to claim 1 wherein the enhancement data reflects a relationship between valid values of two successive compressed representations of the media stream.

3. The method according to claim 1 wherein the step of defining enhancement data comprises defining enhancement data if a valid value of a compressed representation of a media stream is associated with at least two valid values of a successive compressed representation of the media stream.

4. The method according to claim 1 wherein the media stream is defined as an original media stream; and wherein a relationship between valid values of distinct compressed representations of the media stream reflect a relationship between valid values of the original media stream mapped to the valid values of distinct compressed representations of the media stream.

5. The method according to claim 1 wherein the step of defining enhancement data relating to valid values of a pair of compressed representations of the media stream comprises checking a relationship between valid values of lower compressed representations of the media stream, lower compressed representations of the media stream being characterized by a higher compression level.

6. The method according to claim 1 wherein the step of defining enhancement data comprises defining a $p^{th}$ layer enhancement data for valid values of pair of a $(p-1)^{th}$ and a $p^{th}$ compressed representations of the media stream, if the reconstruction of the valid values of the $p^{th}$ compressed representation of the media stream requires the $p^{th}$ layer enhancement data, whereas p ranges between 2 and k, k reflects the number of compression levels.

7. The method according to claim 1 wherein the compressed representations of the media streams are generated by applying a compression function selected from the group consisting of:
   sampling functions;
   quantizing functions;
   linear quantizing functions;
   non-linear quantizing functions; and
   uniform quantizing functions.

8. The method according to claim 1 further comprising a step of compressing the enhancement data.

9. The method according to claim 1 wherein enhancement data includes enhancement data symbols; and wherein the method further comprising a step of variable length encoding the enhancement data symbols to provide enhancement data code words.

10. The method according to claim 1, wherein said media stream comprises one of the list consisting of:
   MPEG compliant media stream;
   original media stream;
   JPEG media stream;
   video stream;
   audio stream;
   data stream;
   H.261 compliant media stream;
   H.263 compliant stream;
   streaming media stream;
   JPEG stream;
   AC-3 audio stream;
   AAC audio stream; and
   a stream containing a plurality of streams.

11. The method according to claim 1 further comprising a step of:
   compressing the media stream according to the compression levels, thereby producing a plurality of compressed representations of the media stream;
   defining a selected one of said compressed representations of the media stream a base media layer, the selected compressed version being compressed according to the base level;
   determining if enhancement data is required for reconstructing a compressed representation of the media stream; and
   generating enhancement data, in response to the determination.

12. A method for generating a compressed representation of a media stream, the media stream comprising a plurality of media stream symbols, the method comprising the steps of:

determining a plurality of compression functions of statistically distinct compression levels, wherein applying a compression function on the media stream produces a compressed representation of the media stream; determining a relationship between valid values of compressed representations of the media stream;

defining the statistically most compressed representation of the media stream as a base layer media stream;

defining enhancement data for representing a relationship between valid values of the compressed representations of the media stream;

compressing the media stream by applying the compression functions, thereby producing a plurality of compressed representations of the media stream;

determining if enhancement data is required for reconstructing a compressed representation of the media stream; and generating enhancement data, in response to the determination.

13. The method according to claim 12 wherein the $p^{th}$ compressed representation is characterized by a $p^{th}$ statistically compression level, p ranges between 1 to k, k reflecting the amount of compression functions; and wherein the $p^{th}$ compressed representation of the media stream is defined as a $p^{th}$ layer media stream.

14. The method according to claim 12 wherein the step of determining starts from the second media layer and ends at the original media stream, the original media stream is defined as the media stream.

15. The method according to claim 12 wherein determining a necessity of enhancement data relating to symbols of a pair of compressed representations of the media stream comprises checking a relationship between symbols of lower compressed representations of the media stream, lower compressed representations of the media stream being characterized by a higher compression level.

16. The method according to claim 12 further comprising a step of compressing the enhancement data.

17. The method according to claim 12 wherein enhancement data includes enhancement data symbols; and wherein the method further comprising a step of variable length encoding the enhancement data symbols to provide enhancement data code words.

18. The method according to claim 17 wherein defining an enhancement data code word reflecting a relationship between a $(p-1)^{th}$ media layer symbol and a $p^{th}$ media layer symbol in response to the complexity of reconstructing an original media layer symbol from the $p^{th}$ media layer symbol.

19. The method according to claim 12, wherein said media stream comprises one of the list consisting of:

MPEG compliant media stream;
original media stream;
JPEG media stream;
video stream;
audio stream;
data stream;
H.261 compliant media stream;
H.263 compliant stream;
streaming media stream;
JPEG stream;
AC-3 audio stream;
AAC audio stream; and
a stream containing a plurality of streams.

20. The method of claim 12 further comprising a step of encrypting the base media layer, whereas the base media layer and the enhancement data defining an encrypted representation of the media stream.

* * * * *